United States Patent [19]
Bolle et al.

[11] Patent Number: 5,546,475
[45] Date of Patent: Aug. 13, 1996

[54] PRODUCE RECOGNITION SYSTEM

[75] Inventors: Rudolf M. Bolle, Bedford Hills; Jonathan H. Connell, Cortlandt-Manor; Norman Haas, Mount Kisco, all of N.Y.; Rakesh Mohan, Stamford, Conn.; Gabriel Taubin, Hartsdale, N.Y.

[73] Assignee: International Business Machines Corporation, Armonk, N.Y.

[21] Appl. No.: 235,834

[22] Filed: Apr. 29, 1994

[51] Int. Cl.$^6$ ............ G06K 9/46; G06K 9/66
[52] U.S. Cl. ............ 382/190; 382/110; 382/164; 382/165; 382/170; 382/173
[58] Field of Search ............ 382/110, 164, 382/165, 170, 173, 190, 199, 181

[56] References Cited

U.S. PATENT DOCUMENTS

| | | | |
|---|---|---|---|
| 3,770,111 | 11/1973 | Greenwood et al. | 250/227 |
| 4,106,628 | 8/1978 | Warkentin et al. | 209/74 |
| 4,515,275 | 5/1985 | Mills et al. | 209/585 |
| 4,534,470 | 8/1985 | Mills | 209/558 |
| 4,574,393 | 3/1986 | Blackwell et al. | 364/526 |
| 4,718,089 | 1/1988 | Hayashi et al. | 382/191 |
| 4,735,323 | 5/1988 | Okada et al. | 209/582 |
| 5,020,675 | 6/1991 | Cowlin et al. | 209/538 |
| 5,060,290 | 10/1991 | Kelly et al. | 382/110 |
| 5,085,325 | 2/1992 | Jones et al. | 209/580 |
| 5,164,795 | 11/1992 | Conway | 356/407 |
| 5,253,302 | 10/1993 | Massen | 382/165 |

FOREIGN PATENT DOCUMENTS

| | | |
|---|---|---|
| 3044268 | 2/1991 | Japan. |
| 5063968 | 3/1993 | Japan. |

OTHER PUBLICATIONS

M. J. Swain & D. H. Ballard, "Color Indexing," Int. Journal of Computer Vision, vol. 7, No. 1, pp. 11–32, 1991.

M. Miyahara & Y. Yoshida, "Mathematical Transform of (R,G,B,) color data to Munsell (H,V,C,) color data," SPIE vol. 1001 Visual Communications and Image Processing, 1988, pp. 650–657.

L. vanGool, P. Dewaele, & A. Oosterlinck, "Texture Analysis anno 1983," Computer Vision, Graphics, and Image Processing, vol. 29, 1985, pp. 336–357.

T. Pavlidis, "A Review of Algorithms for Shape Analysis," Computer Graphics and Image Processing vol. 7, 1978, pp. 243–258.

S. Marshall, "Review of Shape Coding Techniques," Image and Vision Computing, vol. 7, No. 4, Nov. 1989, pp. 281–294.

S. Mersch, "Polarized Lighting for Machine Vision Applications," Proc. of RI/SME Third Annual Applied Machine Vision Cof., Feb. 1984, pp. 40–54 Schaumburg.

B. G. Batchelor, D. A. Hill & D. C. Hodgson, "Automated Visual Inspection" IFS (Publications) Ltd. UK North–Holland (A div. of Elsevier Science Publishers BV) 1985 pp. 39–178.

*Primary Examiner*—Leo Boudreau
*Assistant Examiner*—Phuoc Tran
*Attorney, Agent, or Firm*—Louis J. Percello

[57] ABSTRACT

The present system and apparatus uses image processing to recognize objects within a scene. The system includes an illumination source for illuminating the scene. By controlling the illumination source, an image processing system can take a first digitize image of the scene with the object illuminated a higher level and a second digitized image with the object illuminated at a lower level. Using an algorithm, the object(s) image is segmented from a background image of the scene by a comparison of the two digitized images taken. A processed image (that can be used to characterize features) of the object(s) is then compared to stored reference images. The object is recognized when a match occurs. The system can recognize objects independent of size and number and can be trained to recognize objects that is was not originally programmed to recognize.

32 Claims, 16 Drawing Sheets

First image  Second image

First image  Second image

PRODUCE RECOGNITION SYSTEM

FIELD OF THE INVENTION

This invention relates to the field of recognizing (i.e., identifying, classifying, grading, and verifying) objects using computerized optical scanning devices. More specifically, the invention is a trainable system and method relating to recognizing bulk items using image processing.

BACKGROUND OF THE INVENTION

Image processing systems exist in the prior art for recognizing objects. Often these systems use histograms to perform this recognition. One common histogram method either develops a gray scale histogram or a color histogram from a (color) image containing an object. These histograms are then compared directly to histograms of reference images. Alternatively, features of the histograms are extracted and compared to features extracted from histograms of images containing reference objects.

The reference histograms or features of these histograms are typically stored in computer memory. The prior art often performs these methods to verify that the target object in image is indeed the object that is expected, and, possibly, to grade/classify the object according to the quality of its appearance relative to the reference histogram. An alternative purpose could be to identify the target object by comparing the target image object histogram to the histograms of a number of reference images of objects.

In this description, identifying is defined as determining, given a set of reference objects or classes, which reference object the target object is or which reference class the target object belongs to. Classifying or grading is defined as determining that the target object is known to be a certain object and/or that the quality of the object is some quantitatively value. Here, one of the classes can be a "reject" class, meaning that either the quality of the object is too poor, or the object is not a member of the known class. Verifying, on the other hand, is defined as determining that the target is known to be a certain object or class and simply verifying this is to be true or false. Recognizing is defined as identifying, classifying, grading, and/or verifying.

Bulk items include any item that is sold in bulk in supermarkets, grocery stores, retail stores or hardware stores. Examples include produce (fruits and vegetables), sugar, coffee beans, candy, nails, nuts, bolts, general hardware, parts, and package goods.

In image processing, a digital image is an analog image from a camera that is converted to a discrete representation by dividing the picture into a fixed number of locations called picture elements and quantizing the value of the image at those picture elements into a fixed number of values. The resulting digital image can be processed by a computer algorithm to develop other images. These images can be stored in memory and/or used to determine information about the imaged object. A pixel is a picture element of a digital image.

Image processing and computer vision is the processing by a computer of a digital image to modify the image or to obtain from the image properties of the imaged objects such as object identity, location, etc.

An scene contains one or more objects that are of interest and the surroundings which also get imaged along with the objects. These surroundings are called the background. The background is usually further away from the camera than the object(s) of interest.

Segmenting (also called figure/ground separation) is separating a scene image into separate object and background images. Segmenting refers to identifying those image pixels that are contained in the image of the object versus those that belong to the image of the background. The segmented object image is then the collection of pixels that comprises the object in the original image of the complete scene. The area of a segmented object image is the number of pixels in the object image.

Illumination is the light that illuminates the scene and objects in it. Illumination of the whole scene directly determines the illumination of individual objects in the scene and therefore the reflected light of the objects received by imaging apparatus such as video camera.

Ambient illumination is illumination from any light source except the special lights used specifically for imaging an object. For example, ambient illumination is the illumination due to light sources occurring in the environment such as the sun outdoors and room lights indoors.

Glare or specular reflection is the high amount of light reflected off a shiny (specular, exhibiting mirror-like, possibly locally, properties) object. The color of the glare is mostly that of the illuminating light (as opposed to the natural color of the object).

A feature of an image is defined as any property of the image, which can be computationally extracted. Features typically have numerical values that can lie in a certain range, say, R0–R1. In prior art, histograms are computed over a whole image or windows (sub-images) in an image. A histogram of a feature of an image is a numerical representation of the distribution of feature values over the image or window. A histogram of a feature is developed by dividing the feature range, R0–R1, into M intervals (bins) and computing the feature for each image pixel. Simply counting how many image or window pixels fall in each bin gives the feature histogram.

Image features include, but are not limited to, color and texture. Color is a two-dimensional property, for example Hue and Saturation or other color descriptions (explained below) of a pixel, but often disguised as a three-dimensional property, i.e., the amount of Red, Green, and Blue (RGB). Various color descriptions are used in the prior art, including (1) the RGB space; (2) the opponent color space; (3) the Munsell (H,V,C) color space; and, (4) the Hue, Saturation, and Intensity (H,S,I) space. For the latter, similar to the Munsell space, Hue refers to the color of the pixel (from red, to green, to blue), Saturation is the "deepness" of the color (e.g., from greenish to deep saturated green), and Intensity is the brightness, or what the pixel would look like in a gray scale image.

Texture, on the other hand, is an visual image feature that is much more difficult to capture computationally and is a feature that cannot be attributed to a single pixel but is attributed to a patch of image data. The texture of an image patch is a description of the spatial brightness variation in that patch. This can be a repetitive pattern (of texels), as the pattern on an artichoke or pineapple, or, can be more random, like the pattern of the leaves of parsley. These are called structural textures and statistical textures, respectively. There exists a wide range of textures, ranging from the purely deterministic arrangement of a texel on some tesselation of the two-dimensional plane, to "salt and pepper" white noise. Research on image texture has been going on for over thirty years, and computational measures have been developed that are one-dimensional or higher-dimensional. However, in prior art, histograms of texture features are not known to the inventors.

Shape of some boundary in an image is a feature of multiple boundary pixels. Boundary shape refers to local features, such as, curvature. An apple will have a roughly constant curvature boundary, while a cucumber has a piece of low curvature, a piece of low negative curvature, and two pieces of high curvature (the end points). Other boundary shape measures can be used.

Some prior art uses color histograms to identify objects. Given an (R,G,B) color image of the target object, the color representation used for the histograms are the opponent color: rg=R−G, by=2*B−R−G, and wb=R+G+B. The wb axis is divided into 8 sections, while rg and by axes are divided into 16 sections. This results in a three-dimensional histogram of 2048 bins. This system matches target image histograms to 66 pre-stored reference image histograms. The set of 66 pre-stored reference image histogram is fixed, and therefore it is not a trainable system, i.e., unrecognized target images in one instance will not be recognized in a later instance.

U.S. Pat. No. 5,060,290 to Kelly and Klein discloses the grading of almonds based on gray scale histograms. Falling almonds are furnished with uniform light and pass by a linear camera. A gray histogram, quantized into 16 levels, of the image of the almond is developed. The histogram is normalized by dividing all bin counts by 1700, where 1700 pixels is the size of the largest almond expected. Five features are extracted from this histogram: (1) gray value of the peak; (2) range of the histogram; (3) number of pixels at peak; (4) number of pixels in bin to the right of peak; and, (5) number of pixels in bin 4. Through lookup tables, an eight digit code is developed and if this code is in a library, the almond is accepted. The system is not trainable. The appearances of almonds of acceptable quality are hard-coded in the algorithm and the system cannot be trained to grade almonds differently by showing new instances of almonds.

U.S. Pat. No. 4,735,323 to Okada et al. discloses a mechanism for aligning and transporting an object to be inspected. The system more specifically relates to grading of oranges. The transported oranges are illuminated with a light within a predetermined wavelength range. The light reflected is received and converted into an electronic signal. A level histogram divided into 64 bins is developed, where Level=(the intensity of totally reflected light)/(the intensity of green light reflected by an orange)

The median, N, of this histogram is determined and is considered as representing the color of an orange. Based on N, the orange coloring can be classified into four grades of "excellent," "good," "fair" and "poor," or can be graded finer. The systems is not trainable, in that the appearance of the different grades of oranges is hard-coded into the algorithms.

The use of gray scale and color histograms is a very effective method for grading or verifying objects in an image. The main reason for this is that a histogram is very compact representation of a reference object that does not depend on the location or orientation of the object in the image.

However, for image histogram-based recognition to work, certain conditions have to be satisfied. It is required that: (1) the size of the object in the image is roughly known, (2) there is relatively little occlusion of the object (i.e., most of the object is in the image and not obscured by other objects), (3) there is little difference in illumination of the scene of which the images (reference and target images) are taken from which the reference object histograms and target object histograms are developed, and (4) the object can be easily segmented out from the background or there is relatively little distraction in the background. Under these conditions, comparing a target object image histogram with reference object image histograms has been achieved in numerous ways in the prior art.

STATEMENT OF PROBLEMS WITH THE PRIOR ART

Some prior art matching systems and methods, claim to be robust to distractions in the background, variation in viewpoint, occlusion, and varying image resolution. However, in some of this prior art, lighting conditions are not controlled. The systems fail when the color of the illumination for obtaining the reference object histograms is different from the color of the illumination when obtaining the target object image histogram. The RGB values of an image point in an image are very dependent on the color of the illumination (even though humans have little difficulty naming the color given the whole image). Consequently the color histogram of an image can change dramatically when the color of the illumination (light frequency distribution) changes. Furthermore, in these prior art systems the objects are not segmented from the background, and, therefore, the histograms of the images are not area normalized. This means the objects in target images have to be the same size as the objects in the reference images for accurate recognition because variations of the object size with respect to the pixel size can significantly change the color histogram. It also means that the parts of the image that correspond to the background have to be achromatic (e.g. black), or, at least, or a coloring not present in the object, or they will significantly perturb the derived image color histogram.

Prior art such as that disclosed in U.S. Pat. No. 5,060,290 fail if the size of the almonds in the image is drastically different than expected. Again, this is because the system does not explicitly separate the object from its background. This system is used only for grading almonds: it can not distinguish an almond from (say) a peanut.

Similarly, prior art such as that disclosed in U.S. Pat. No. 4,735,323 only recognizes different grades of oranges. A reddish grapefruit might very well be deemed a very large orange. The system is not designed to operate with more than one class of fruit at a time and thus can make do with weak features such as the ratio of green to white reflectivity.

In summary, much of the prior art in the agricultural arena, typified by U.S. Pat. Nos. 4,735,323 and 5,060,290, is concerned with classifying/grading produce items. This prior art can only classify/identify objects/products/produce if they pass a scanner one object at a time. It is also required that the range of sizes (from smallest to largest possible object size) of the object/product/produce be known beforehand. These systems will fail if more than one item is scanned at the same time, or to be more precise, if more than one object appears at a scanning position at the same time.

Further, the prior art often requires carefully engineered and expensive mechanical environment with carefully controlled lighting conditions where the items are transported to predefined spatial locations. These apparatuses are designed specifically for one type of shaped object (round, oval, etc.) and are impossible or, at least, not easily modified to deal with other object types. The shape of the objects inspires the means of object transportation and is impossible or difficult for the transport means to transport different object types. This is especially true for oddly shaped objects like broccoli or ginger. This, and the use of features that are specifically selected for the particular objects, does not allow for the prior art to distinguish between types of produce.

Additionally, none of the prior art are trainable systems where, through human or computer intervention, new items are learned or old items discarded. That is, the systems can not be taught to recognize objects that were not originally programmed in the system or to stop recognizing objects that were originally programmed in the system.

One area where the prior art has failed to be effective is in produce check out. The current means and methods for checking out produce poses problems. Affixing (PLU—price lookup) labels to fresh produce is disliked by customers and produce retailers/wholesalers. Pre-packaged produce items are disliked, because of increased cost of packaging, disposal (solid waste), and inability to inspect produce quality in pre-packaged form.

The process of produce check-out has not changed much since the first appearance of grocery stores. At the point of sale (POS), the cashier has to recognize the produce item, weigh or count the item(s), and determine the price. Currently, in most stores the latter is achieved by manually entering the non-mnemonic PLU code that is associated with the produce. These codes are available at the POS in the form of printed list or in a booklet with pictures.

Multiple problems arise from this process of produce check-out:

(1) Losses incurred by the store (shrinkage). First, a cashier may inadvertently enter the wrong code number. If this is to the advantage of the customer, the customer will be less motivated to bring this to the attention of the cashier. Second, for friends and relatives, the cashier may purposely enter the code of a lower-priced produce item (sweethearting).

(2) Produce check-out tends to slow down the check-out process because of produce identification problems.

(3) Every new cashier has to be trained on produce names, produce appearances, and PLU codes.

OBJECTS OF THE INVENTION

An object of this invention is an improved apparatus and method for recognizing objects such as produce.

An object of this invention is an improved trainable apparatus and method for recognizing objects such as produce.

Another object of this invention is an improved apparatus and method for recognizing and pricing objects such as produce at the point of sale or in the produce department.

A further object of this invention is an improved means and method of user interface for automated produce identification, such as, produce.

SUMMARY OF THE INVENTION

The present invention is a system and apparatus that uses image processing to recognize objects within a scene. The system includes an illumination source for illuminating the scene. By controlling the illumination source, an image processing system can take a first digitized image of the scene with the object illuminated at a higher level and a second digitized image with the object illuminated at a lower level. Using an algorithm, the object(s) image is novelly segmented from a background image of the scene by a comparison of the two digitized images taken. A processed image (that can be used to characterize features) of the object(s) is then compared to stored reference images. The object is recognized when a match occurs.

Processed images of an unrecognized object can be labeled with identity of object and stored in memory, based on certain criteria, so that the unrecognized object will be recognize when it is imaged in the future. In this novel way, the invention is taught to recognize previously unknown objects.

Recognition of the object is independent of the size or number of the objects because the object image is novelly normalized before it is compared to the reference images.

Optionally, use interfaces and apparatus that determines other features of the object (like weight) can be used with the system.

DETAILED DESCRIPTION OF THE INVENTION

Figure 1:
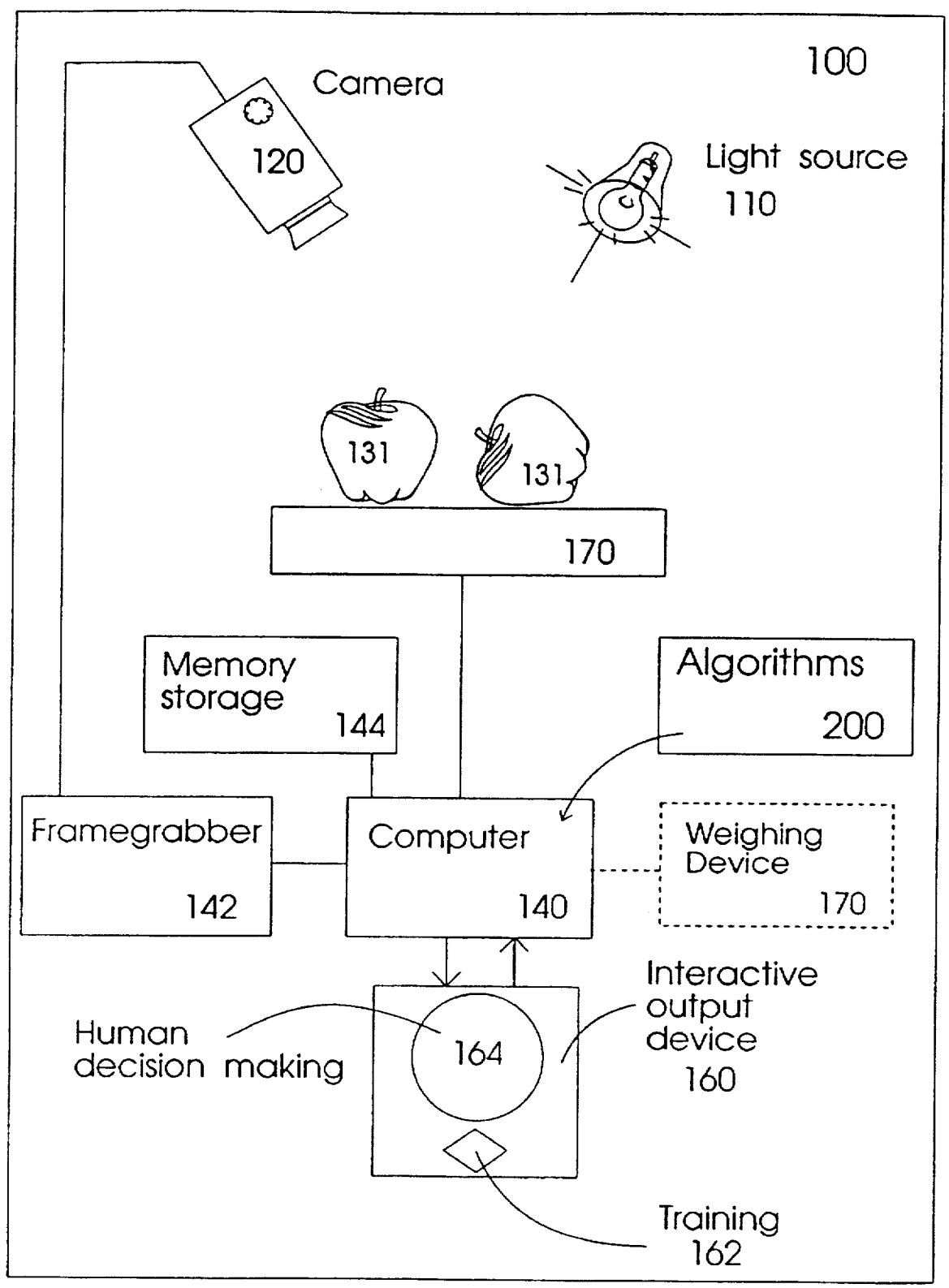
FIG. 1 is a block diagram of the one preferred embodiment of the present system.

The apparatus 100 shown in FIG. 1 is one preferred embodiment of the present invention that uses image processing to automatically recognize one or more objects 131.

A light source 110 with a light frequency distribution that is constant over time illuminates the object 131. The light is non-monochromatic and may include infra-red or ultra violet frequencies. Light being non-monochromatic and of a constant frequency distribution ensures that the color appearance of the objects 131 does not change due to light variations between different images taken and that stored images of a given object can be matched to images taken of that object at a later time. The preferred lights are flash tubes Mouser U-4425, or two GE cool-white fluorescent bulbs (22 Watts and 30 Watts), GE FE8T9-CW and GE FC12T9-CW, respectively. Such light sources are well known.

A video input device 120 is used to convert the reflected light rays into an image. Typically this image is two dimensional. A preferred video input device is a color camera but any device that converts light rays into an image can be used. These cameras would include CCD camera and CID cameras. The color camera output can be RGB, HSI, YC, or any other representation of color. One preferred camera is a Sony card-camera CCB-C35YC or Sony XC-999. Video input devices like this 120 are well known.

Color images are the preferred sensory modality in this invention. However, other sensor modalities are possible, e.g., infra-red and ultra-violet images, smell/odor (measurable, e.g., with mass spectrometer), thermal decay properties, ultra-sound and magnetic resonance images, DNA, fundamental frequency, stiffness and hardness. These modalities can be enabled with known methods of illuminating, measuring, or taking samples of the object 131 and with a compatible imaging device 120 for creating the image.

The object 131 is the object being imaged and recognized by the system 100. The object 131 can comprise one or more items. Although it is preferred that objects 131 be of one type (variety), e.g., one or more apples, the items can be of different types, e.g., a cereal box (Object A) and an apple (Object B). System 100 will then recognize objects as either as (1) Object A, (2) Object B, (3) both Object A and Object B, or, (4) reject objects as unrecognizable. The object(s) can be virtually anything that can be imaged by the system 100, however preferred objects 131 are bulk items including produce (fruits and vegetables), hardware, boxed goods, etc.

A calculating device 140, typically a computer 140, is used to process the image generated by the video input device 120 and digitized (to be compatible with the computer 140) by a frame grabber 142.

The processing is performed by an algorithm 200. Other calculating devices 140 include: personal computers, and workstations. The calculating device 140 can also be one or more digital signal processors, either stand-alone or installed in a computer. It can also be any special hardware capable of implementing the algorithm 200. A preferred embodiment is a Datatranslation DSP board DT 2878 coupled to a Datatranslation DT 2871 frame grabber board residing in an IBM ValuePoint computer, or in the IBM 4690 series of POS Cash Registers. The frame grabber 142 is a device that digitizes the image signal from the camera 120. If the camera 120 is a digital camera then a separate frame grabber 142 may not be required. The digitizer may be separate from the computer 140 or an integrated part of it. The image may be stored in a standard memory device 144. Given this disclosure, one skilled in the art could develop other equivalent calculating devices 140 and frame grabbers 142.

Figure 13:
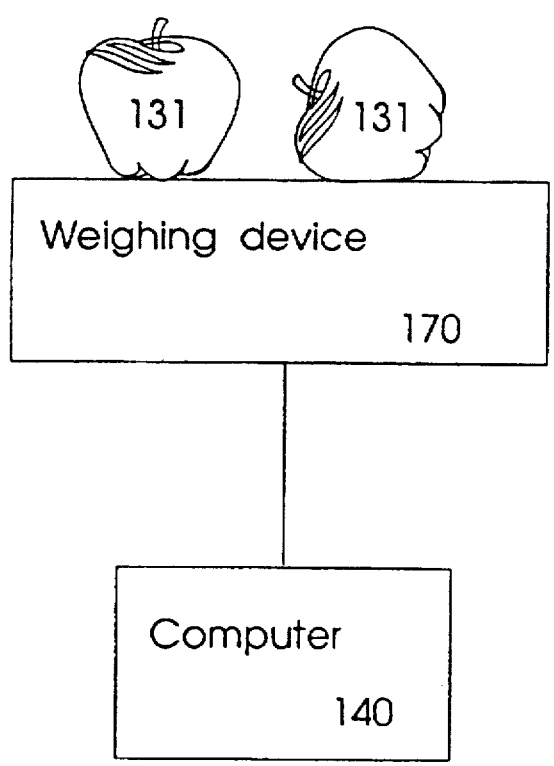
FIG. 13 is block diagram showing a weighing device.

An optional interactive output device 160 can be connected to the calculating device 140 for interfacing with a user, like a cashier. The output device 160 can include screens that assist the user in decision making 164 and can also provide mechanisms to train 162 system 100 to recognize new objects. An optional weighing device 170 can also provide an input to the calculating device 140 about the weight (or density) of the object 131. See description below (FIG. 13).

Figure 2:
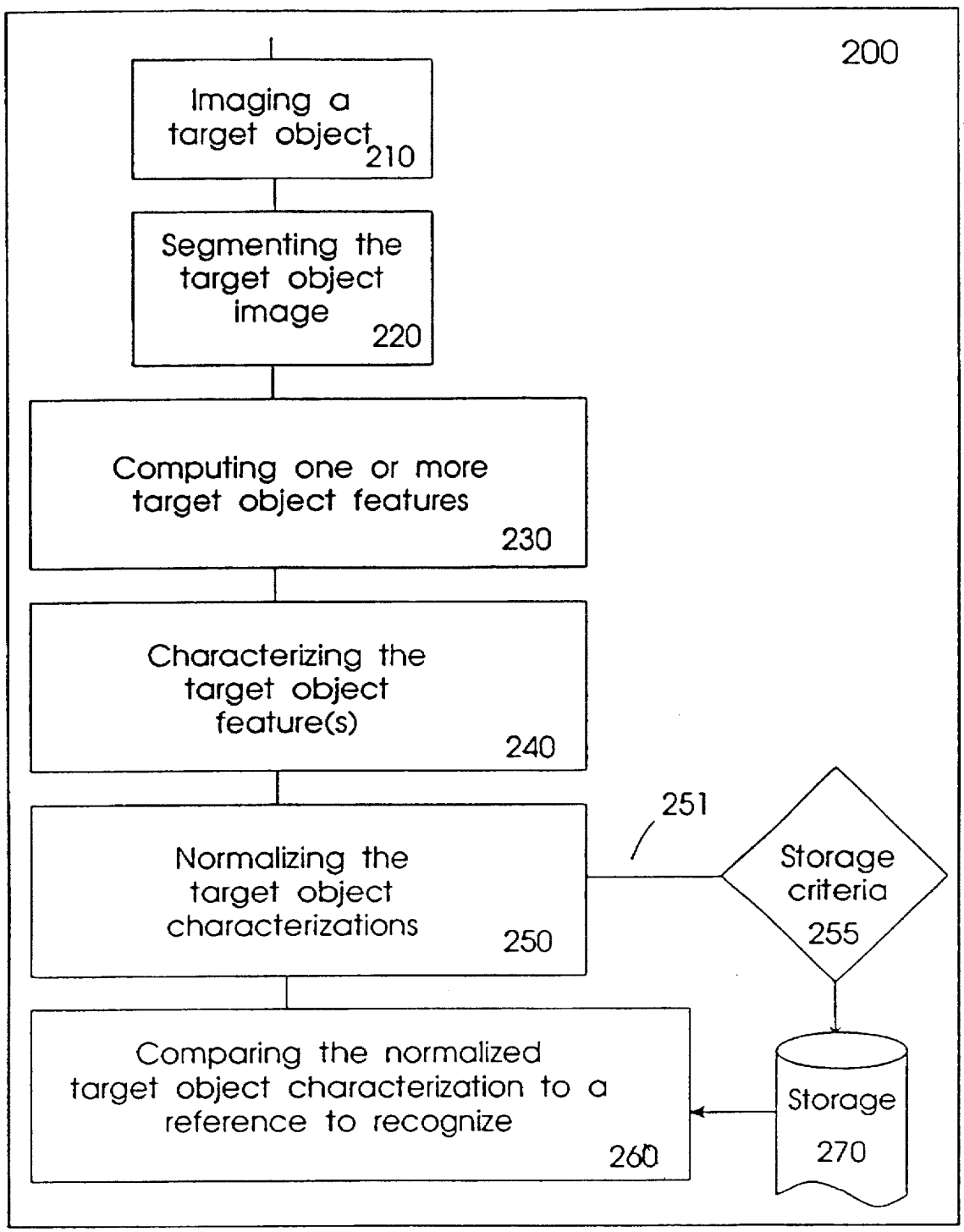
FIG. 2 is a flow chart showing on preferred embodiment of the present method for recognizing objects.

FIG. 2 is a flow chart of the algorithm 200 run by the calculating device, or computer 140. In step 210, a target object to be recognized is imaged by camera 120. Imaging like this is well known. The image of target object 131 is then novelly segmented 220 from its background. The purpose of step 220 is to separate the target object 131 from the background so that the system 100 can compute characteristics of separated object 131 image pixels independently of the background of the scene. In step 230 one or more features of the object 131 can be computed, preferably pixel by pixel, from the segmented object image. In step 240, characterizations of these pixel-by-pixel computed feature sets are developed. Normalizing, in step 250, ensures that these characterizations do not depend on the actual area, length, size, or characteristics related to area/length/size that the object(s) 131 occupy in the image, so that one or multiple instances of object 131 are recognized as same object type. Preferred means of normalizing the characterization by the segments occupied by objects 131 in the image is achieved by counting the number of times feature characteristic(s) are computed. (This is described further in FIG. 7. The preferred means of normalizing is by area or by length). In step 260 the count-normalized characterization of the target object is compared with the count-normalized characterizations of reference objects, which are stored in memory storage 270. The storage 270 may be located in the storage device 144 or computer 140. (See the description in FIG. 8.) In step 251 area-normalized characterizations are stored, depending on certain criteria 255 in computer memory 270. This step enables the system 100 to be trained, since the storage criteria 255 might permit storage 251 of new reference images which can later be compared to target 131 images. (See the description of FIG. 15.)

Figure 3A:
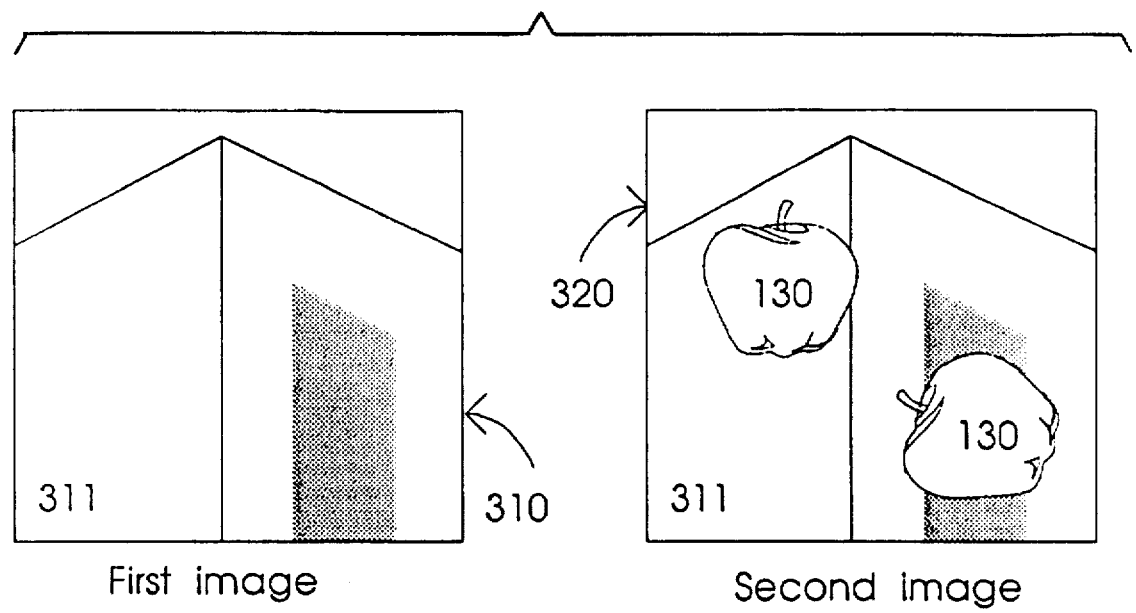
FIG. 3 illustrates segmenting a scene into an object image and a background image.
Figure 3B:
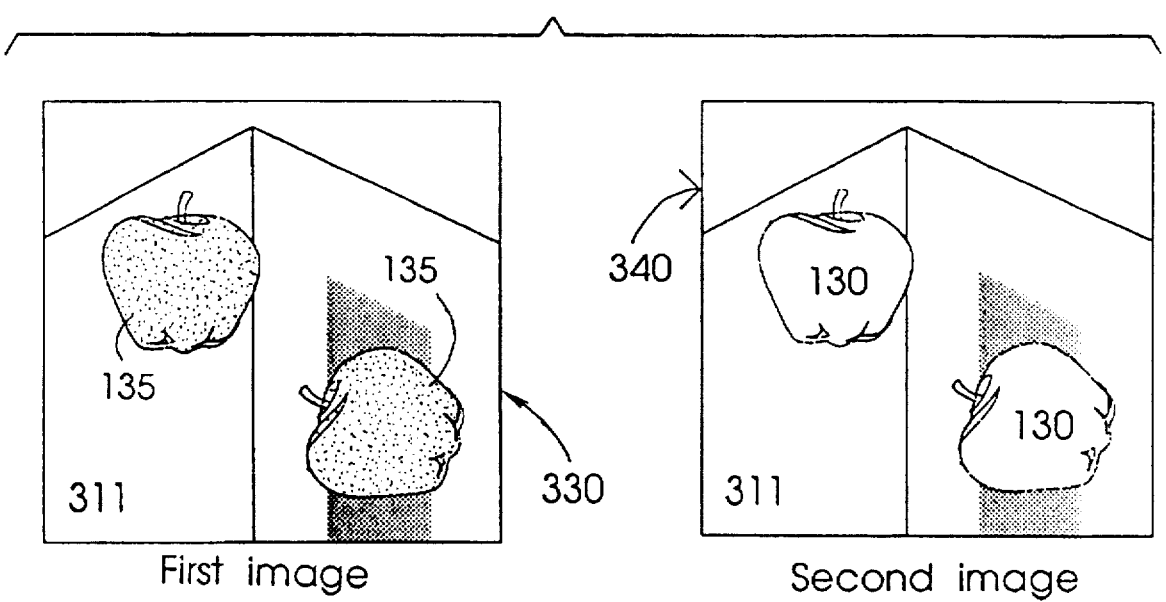

Step 220 is the segmenting or separating of the object image from the background image. This step is performed so that the features of the target object can be processed independently of the effects and disturbances of the background of the scene. FIG. 3 illustrates two preferred methods (FIG. 3a and FIG. 3b, respectively) that segment the object image from the background image.

FIG. 3a shows two scenes. The first imaged scene 310, shows an image of a background 311 without any other objects present in the field of view of camera 120. The second imaged scene 320 includes both an image of the scene background 311 and an image 130 of one or more objects 131. Here the pixels of the imaged object 130 replace pixels in the background image 311 in those areas of the scene image 320 where object 131 is present. Hence, it is an image of background 311 with instances of objects 131 present in the scene.

A comparison of the scenes 310 and 320, preferably on a pixel by pixel basis, allows the object image 130 to be segmented (separated out) from the background image 311 of the scene. If for a given pixel in the 320 image, the brightness is different from (e.g., more then) the image brightness of said pixel in 310, this pixel belongs to object image 130. If for a given pixel in the image 320, the brightness is equal to same pixel in 310, this pixel belongs to background image 311. (See the description of FIG. 5).

FIG. 3b shows two images of a scene with a background and one or more objects produced by a preferred embodiment of this invention that enables segmentation of the object image. Image 330 in FIG. 3b is an image of a scene (including objects 131 and a background 311) with light source 110 off. That is, the scene image 330 consist of an image of background 311 illuminated by ambient light. Also in the scene image 330 are the object images 135 obscuring the background. Because the light source 110 is off, object images 135 appear dark in scene image 330 because they are not illuminated by the light source 110.

Image 340 in FIG. 3b is an image of the scene with light source 110 on. In this case, the light source 110 illuminates objects 132 in field of view of camera with an amount of light greater than ambient light. This results in the object images 130 being brighter (than in 330) in scene image 340.

Figure 4:
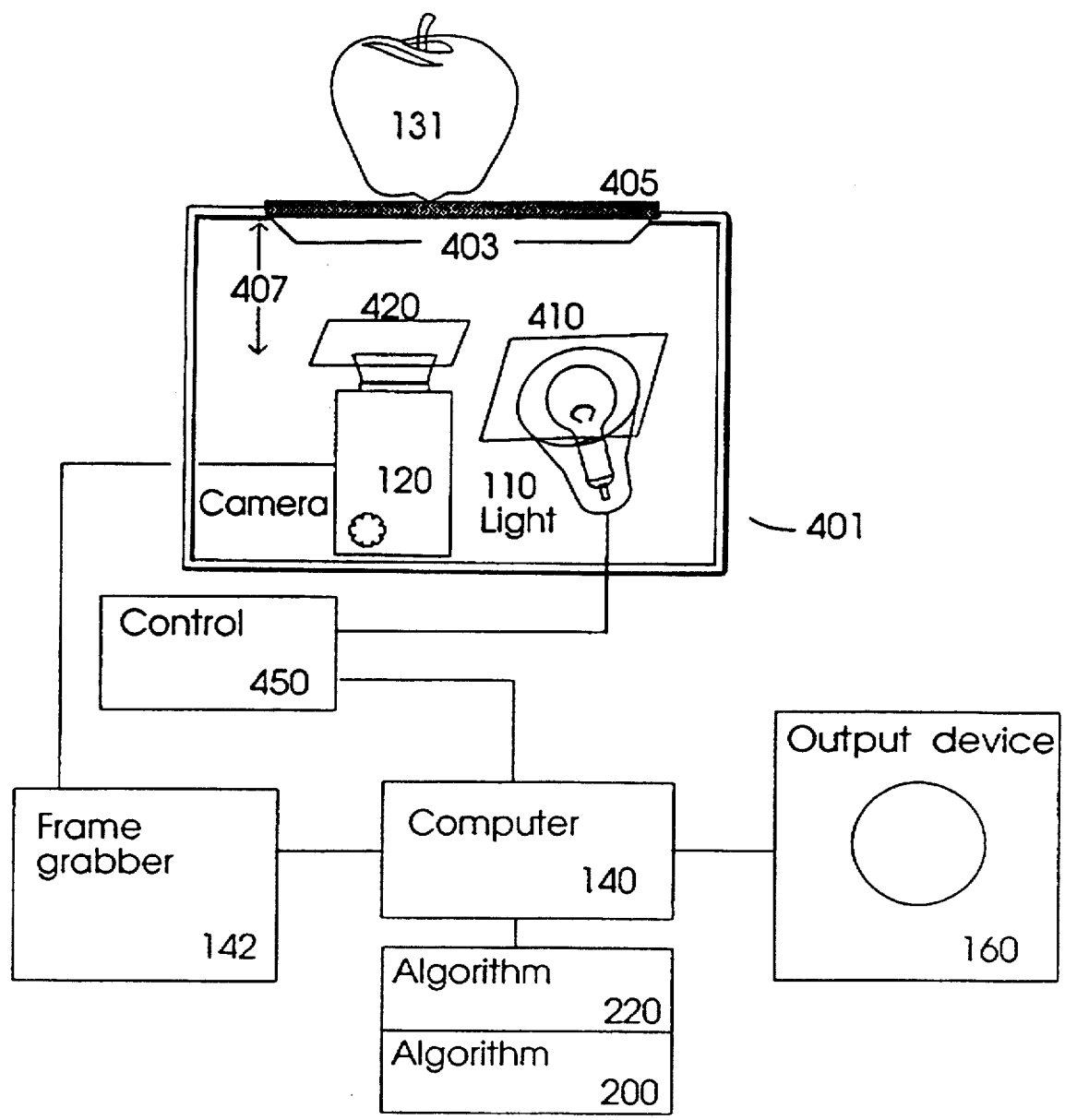
FIG. 4 is a block diagram of a preferred embodiment of apparatus for segmenting images and recognizing object in images.

FIG. 4 is a block diagram showing a preferred system 400 for imaging scenes (such as those described in FIG. 3), segmenting object images 130 from their background image 311 of the physical background 312, and recognizing object(s) 131. A general description of component 401 of this system 400 can be found in U.S. patent application No. 08/235,064, entitled "Object Imaging System" filed in April, 1994 which is herein incorporated by reference.

The preferred system 400 places the object 132 above light 110 and camera 120, thus providing images of object 131 looking up from below. The system 400 provides a support 405 for the object 131 and also ensures that object is of fixed and repeatable distance 407 from camera 120. In addition, the system 400 allows imaging of shiny object (like a plastic bag) with reduced glare (specular reflections) in the image by providing a filtering system comprised of 410 and 420.

The system 400 comprises an opaque enclosure 401 for the light 110 and camera 120. The enclosure has a single opening 403 facing the object 131. The opening 403 is of a sufficient size to allow the object 131 to be imaged by the camera 120 and illuminated by the light 110. The opening can be square, round or any other shape. A transparent surface 405 covers the opening 403 in the enclosure 401. This surface 405 could be a sheet of glass. The transparent surface 405 provides a support on which the imaged object 131 can be placed. By placing the object 131 on the surface 405, the distance 407 between camera 120 and object 131 remains fixed thus providing the means for repeatable imaging.

To remove glare from image of object 131 (from object 131 itself and possibly a surrounding plastic bag) a polarizing filter 420 is incorporated with the lens of camera 120 or placed just above the lens of the camera 120. A second polarizing filter 410 is placed between the light 110 and the opening 403. This insures that the light reaching the object 131 is polarized. Alternatively, the light may be completely enclosed by the polarizer. If the light is partly enclosed in a box (such as a camera flash) or by a reflector (such as a photographic spotlight) the polarizer needs to be placed only on the opening in the light assembly which allows the light through. The direction of the polarization in first filter 410 is orthogonal to the direction of polarization second filter 420. It is well-known from prior art that specular reflection reflected off an object (such as object 131) is polarized as opposed to the diffuse (matte) reflection reflected off the object. Imaging object 131 with a polarizing filter 420 thus reduces glare in image. Further, illuminating 131 with light 110 polarized by 4100 reduces the amount of glare on object 131. 410 also ensures that the polarization angle of the reflected specular light, off object 131 is orthogonal to polarizer 420. Hence, imaging object 131 through polarizer 420 which is orthogonal to polarizer 410 further reduces the amount of glare in object image 130.

A light Control 450 switches the light 110 on and off, or switches light 110 between different intensity levels. The control 450 may be implemented on the computer 110 or be connected directly to the light 110 or may be a separate device. The control may be a part of the light 110 as a timing device such as in a strobe. The control may be synchronized with the camera or the computer or both. Light switching controls 450 are well known.

Figure 5:
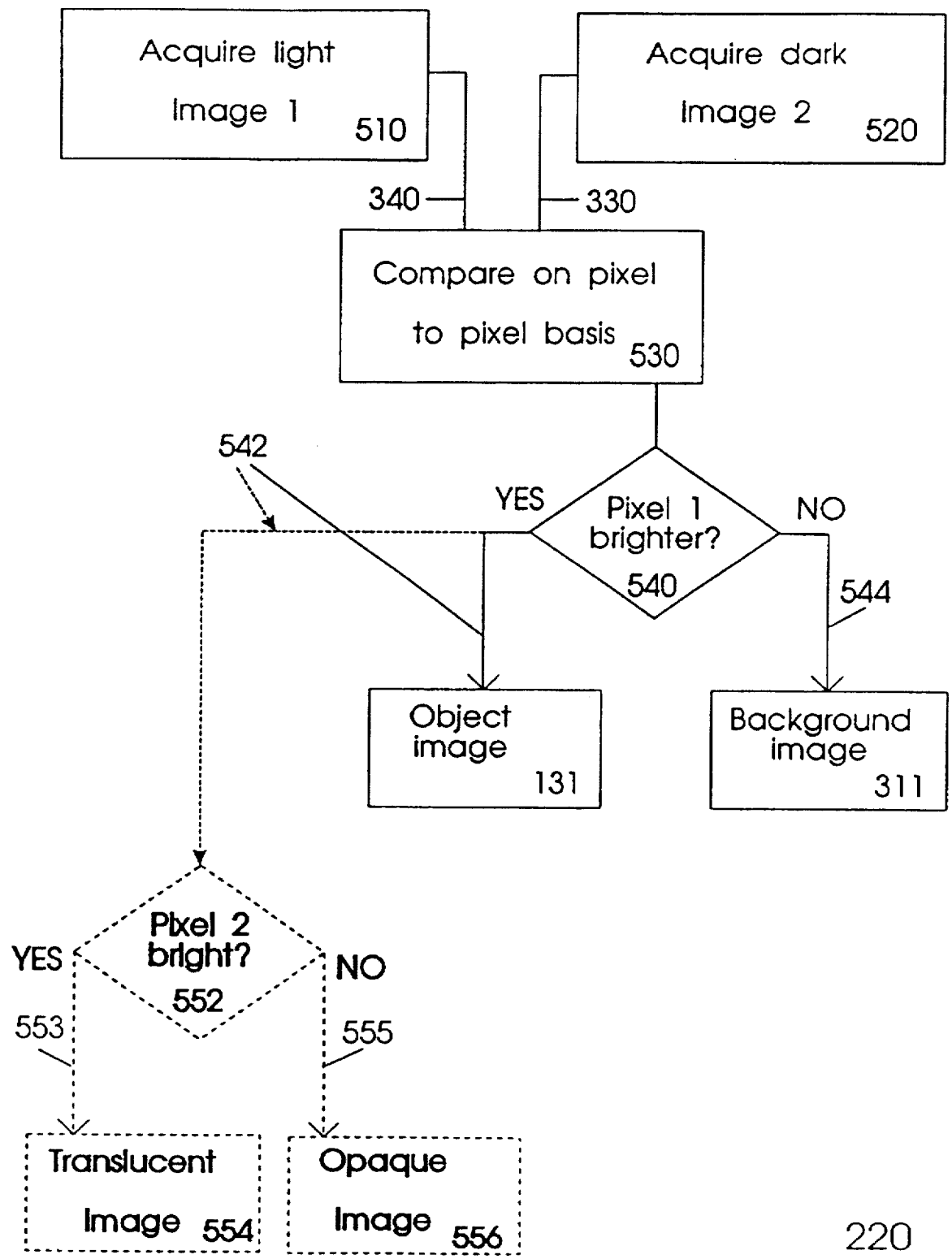
FIG. 5 is a flow chart of a preferred method for segmenting target object images.

The segmenting step 220 of FIG. 2 is further described in FIG. 5, which shows a preferred method for segmenting the object image from the scene.

In step 510, an image (a first image) of the scene is produced with the light 110 switched on, or at a higher intensity, so as to illuminate object 132 properly. Control 450 controls the light 110 switching.

In step 520, a second image of the scene is produced with the light 110 switched off or set to a level below the level in step 510. The setting of the light 110 should be such that the object 131 appears darker in the second image than in the first image. By performing these novel steps, the object image 130 can be separated or segmented from the background image 311 in the steps below.

Further, the object 131, the background 312, and the image input device 120 should be at the same position in both step 510 and 520 to assure that the first and second images are in spatial registration. Suppose each pixel is numbered starting in the upper left corner of the image then proceeding across the first line then down to the second line in the manner of reading a book. Registration means that each numbered pixel in the first image corresponds to the same area of the scene (object(s) 131 and background 312) as the identically numbered pixel in the second image. Proper registration can be ensured by either acquiring the first and second image in quick succession, or by imaging a stationary object 131 against a stationary background 312.

The order of acquiring the first and second image may be reversed; that is, step 520 can be performed before step 510.

In step 530 of the algorithm 220, the first and second images are digitized in the frame grabber 142. In the computer 140, each and every pixel in the first digitized image is compared to the respective pixel at the same location in the second digitized image. Pixel by pixel comparisons such as this are known in the image processing art. For example, although the pixels in each pair being compared must correspond to one another (i.e., be in the same respective location in each image), the corresponding pixel pairs in the images can be compared in any order. Further, alternative comparisons can be made, e.g., comparing ever second or third pixel.

In step 540, a check is performed on a pixel by pixel basis to determine if a pixel in the first image is brighter than the corresponding pixel in the second image by more than a value T. In any pixel comparison, if the pixel in the first image pixel is brighter than its corresponding pixel in the second image by more than T, the algorithm 220 takes the branch 542 and designates this pixel as corresponding to the object 131. Likewise, if the pixel comparison shows that the pixel in the first image is not brighter than its corresponding pixel in the second image by more than the value T, the algorithm 220 takes the branch 544 and designates this pixel as corresponding to the image 311 of physical background 312.

The value of tolerance T may be a constant. A preferred tolerance T is 5% of the largest image intensity. Alternatively, the value of T may vary depending on the positions of pixels in the image or depending on the intensity of the pixel in the dark image. The positional variation of T allows the system to compensate for uneven illumination from source 110. The dark intensity variation of T allows the system to correctly identify foreground objects with low reflectivities (such as black objects). The value T may be fixed or may be recomputed from time to time by the system. It might, for instance, be necessary to change the value of T as light source 110 ages or changes in intensity for some other reason (such as a variation in the AC line voltage supplied to the bulb). This recomputation could be performed on a pair of images of the background with no object (one image of the background 312 highly illuminated and one less so). Since no object is present, both background images should appear to be illuminated the same amount (with ambient light). However, in practice, the light 110 might illuminate the background 312 slightly when the light is switched to a higher intensity. Therefore a tolerance T is chosen for the comparison of the corresponding pixel pairs. The tolerance T could then be set so that only a very small number of pixels in this pair of background images actually passes the test. For example, in a preferred embodiment, T would be set so that fewer than 10% of the pixel pairs differ in illumination more than the tolerance T.

In a preferred embodiment, the steps 530 and 540 are performed on a pixel by pixel basis for each pixel location in the scene image. The result is that the pixels corresponding to the object 131 are collected in a segmented object image 130. Specifically, in the segmented object image, all pixels from the first image that are substantially brighter than their corresponding pixel in the second image are collected in segmented object image at the position they were in the first image. Therefore, the segmented object image corresponds to the desired image of the object 131 removed from the background 312. If needed, the remaining pixels in the image (e.g., the pixels not corresponding to the object 130) can be assigned any desired value and/or can be further processed using known image processing techniques.

In like manner, the pixels corresponding the background 312 are collected in a segmented background image 311. Specifically, all pixels from the first image that are not substantially brighter than the corresponding pixel in the second image are collected in the segmented background image at the position they were in the first image. (In a preferred embodiment, "substantially brighter" means that the difference in illumination between the pixels in the corresponding pixel pair is greater than the tolerance, T.) The segmented background image corresponds to the image of the background 311 with the object 130 removed. If needed, the remaining pixels in the segmented background image (i.e., those corresponding to the removed object pixel locations) can be assigned any desired value and/or further processed using known image processing techniques.

If only the image of the object 130 is desired, steps 544 to obtain 311 need not be performed. Similarly, if only the image of the background 312 is desired, steps 542 and 130 need not be performed.

In an alternative preferred embodiment, a translucent part of the object 131 (for example, a plastic cover) may be separated from an opaque part of the object 131, by adding steps 552, 554, and 556.

In this embodiment, branch 542 goes to step 552 instead of step 540. Before step 552, it has been determined already that the pixel in the first image is brighter than its corresponding pixel in the second image. Step 552 determines if the object 130 pixels of the second image (the object 131 under low illumination) are brighter than a value V, a second tolerance value. If so, branch 553 is taken and the object pixel belongs to the translucent part 554 of object 130. (The object is translucent at this pixel location since some ambient light passed through the object 130 and was imaged at this location when the light 110 was switched to low illumination.) If not, then branch 555 is taken and the pixel belongs to opaque part 556 of object 130. (No ambient light, or an amount below the tolerance, V, is measured through the opaque part of the object 130.) The value V may be constant for each pixel in the second image or may be variable, depending, for example, on the position on the pixel in the second image. Note that the value, V, may further be computed as describe above, from an image of the background 135 alone, by choosing a V such that 95% to 85% of the background image is brighter than V. A preferred value for V is 20% of the brightest image intensity.

In step 554, a translucent object image is created. In this step, each pixel in the first image (which belongs to the object) which corresponds to a pixel in the second image that is brighter than the value V, corresponds a translucent part of object 130 and is stored in a translucent object image. After all pixels of the first and second images are so processed, the translucent object image will contain only the image of the translucent parts of object 130. If needed, the remaining pixels of the translucent object image may be assigned any desired value and/or processed further.

In step 556, an opaque object image is created. In this step, each pixel in the first image (which belongs to the object) which corresponds to a pixel in the second image equal to or darker than the value V, corresponds to an opaque part of object image 130 and is stored in the opaque object image 556. After all pixels of the first and second images are so processed, the opaque object image will contain only the image of the opaque parts of object 130. If needed, the remaining pixels of the opaque object image may be assigned any desired value and/or be further processed.

If only an image of the opaque parts of the object 130 is desired, step 554 need not be performed. Similarly, if only an image of the translucent parts of the object 130 is desired, step 556 need not be performed.

In another preferred embodiment, step 552 is combined with step 540 and steps 542 and 130 are removed. This results in the translucent object image or the opaque object image (or both) but not the complete segmented object image 130.

Other combinations of steps 552, 554 and 556 with the previous steps are within the contemplation of this invention.

After the image is segmented 220, a computation of one or more target object features is performed. Refer to step 230 of FIG. 2. The computation 230 is performed by the computer 140 and is used to determine features of the target object. This determination is made by novelly performing this step 230 only on the separated out (segmented) image 130 of the target object obtained in step 220. For each pixel in the segmented object image, features are determined. For example, such features can be computed using the color of a single pixel, or using the (color) value of a pixel and the (color) values of its surrounding pixels. Features include, but are not limited to, color, shape, texture, density of the segmented image of target object. Normally, the feature(s) are represented by one or more feature values.

Once one or more features are determined 230, the feature or set of features is characterized 240. Histogramming is a preferred way of doing the characterization 240. See the description of FIG. 6 below. However, other methods of characterizing feature(s) can be used. For example, median feature value, first order (mean value) and/or higher order statistics of computed feature values, or any statistic that can be derived from the computed set of feature values can be used. Given this disclosure, one skilled in the art could develop other equivalent ways to characterize features.

The normalization step 250 of the algorithm 200 is a novel step for making the characterized feature(s) of an object independent of the size of the actual object 131 being imaged. This step enables one or multiple instances of object 131 to be recognized by the apparatus 100 independent of the number of objects 131, or size of objects 131, in the scene. Normalization 250 is performed on one or more of the computed feature characterization(s). A preferred method of normalization can be done with respect to area or length, e.g., obtained by counting number of pixels in segmented object image (see the description of FIG. 7, below) or by counting number of pixels on boundary of segmented object image (see the description of FIG. 12, below).

Other methods of normalization, e.g., normalizing with respect to any other characteristic derived from segmented object image, are also within the contemplation of the invention.

Another novel feature of the present invention enables the system 100 to be trained. If a normalized characterization of an object 131 is not recognized, i.e., not matched with reference information (step 260), the normalized characterization is checked 251 if it satisfies some storage criteria 255. If the normalized characterization of the unrecognized object meets the storage criteria 255, it will be stored 270 along with the other reference information. Therefore, the next time this object 131 is imaged by the system 100, it will be matched to a reference image and recognized. See the description of FIG. 9 below. Training allows the system 100 to be able to recognize objects that the system is not "hard-wired" (pre-programmed) to recognize, thus making the system more flexible. The stored characterization is normalized so that the number of objects 131 used for reference characterization can be different from number of objects 131 used for developing target characterization.

Storage criteria can include any criteria established by the system 100 design. The ability to select and/or create storage criteria 255 can also be given to a user through an interface 160. A simple storage criteria might be to store any information provided about an unrecognized object in the reference database 270. Other storage criteria might include, but are not limited to: (1) the quality of image 210 is good; (2) a large percentage of target object occupies image 210; (3) characterizations should be sufficiently close (in the sense of 840 described in FIG. 8) to references of target object in database.

In step 260 of the algorithm 200, normalized characteristics of the target object 131 are compared 260 to one or more normalized reference object characteristics. This comparison 260 depends very much on the method for characterizing object features, for which examples are given in step 240 above. One preferred comparison 260 is done with of area or length normalized histograms.

One or more reference object characteristics are stored 270 on a memory storage device. This device can be located in memory on the computer 140 or a separate secondary storage device 144. A preferred method for storing 270 the reference object characteristics is to use a series of area normalized feature histograms that characterized object features. Each of these series of area normalized histograms has associated with it a unique object type identifier. A preferred method of storing the area normalized feature histograms is by using a vector of normalized feature histograms. That is, the normalized frequencies of occurrence of the different feature values.

Figure 6:
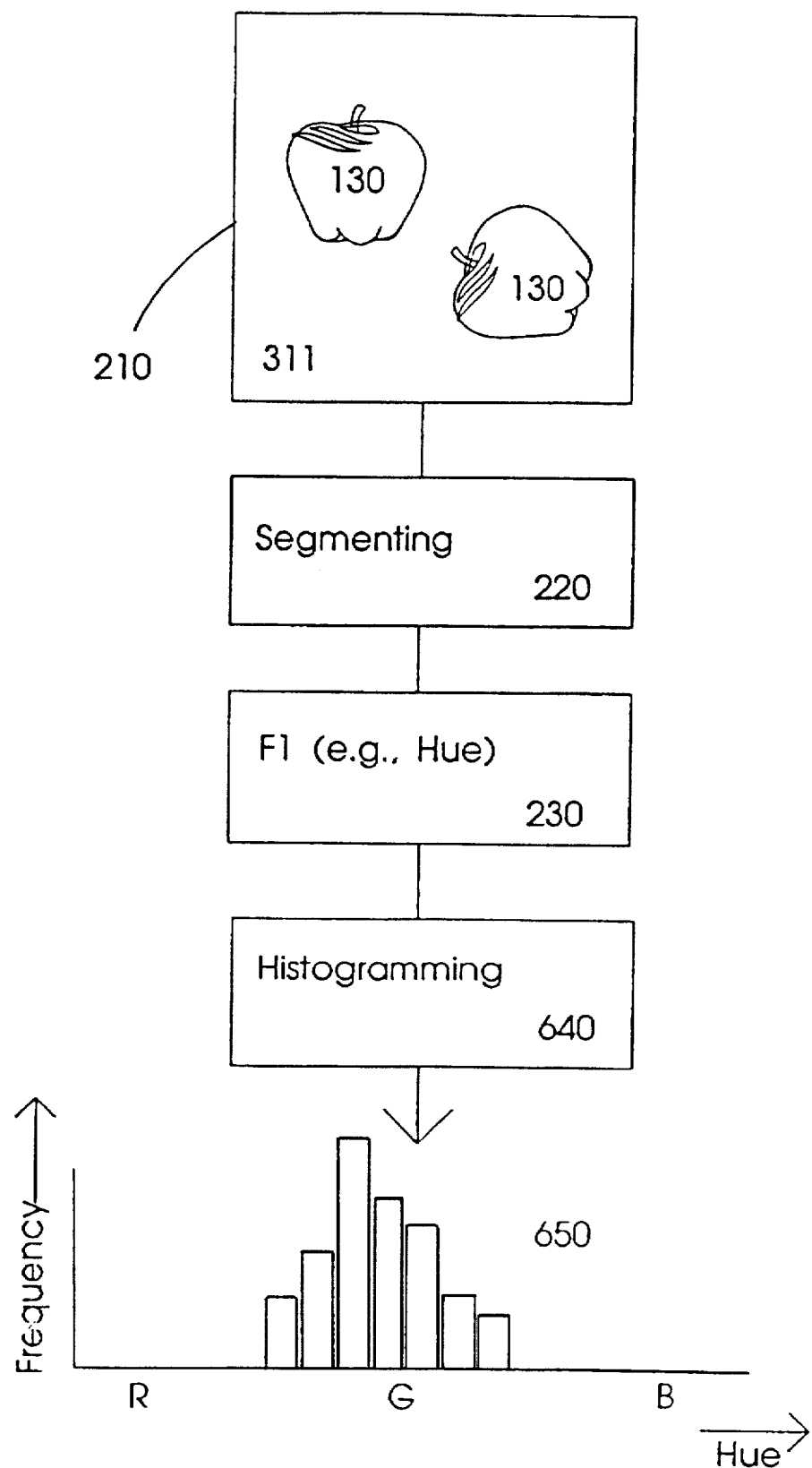
FIG. 6 is a flow chart showing a preferred method of characterizing reference ot target object feature(s).

FIG. 6 is a flow chart showing one preferred method of developing a histogram of a feature. In this non-limiting example, the feature, F1, Hue is used. However, any feature that can be extracted from the segmented image can be used. Note that the present invention novelly extracts the feature only from the segmented object image(s) 130. The feature histogrammed also can be derived from other information about the segmented object. For example, Hue could be derived from some other feature in a color map.

To develop the histogram 650, the scene is first imaged (step 210 of FIG. 2) and the object image 130 is segmented 220. The feature to be histogrammed is then computed or determined using prior art techniques 230, preferably on a pixel by pixel basis (but could also be done for every other pixel, or any pre-determined subset of pixels) Prior art techniques are then used to develop 640 the histogram 650 of the feature, F1.

For example, a histogram array of M intervals (bins) is first initialized to zero. Then, on a pixel by pixel basis, the Hue of pixel is computed. This computed Hue value for a particular pixel is quantized so that it will fall into one of the M bins, say Bin(x), of the histogram. The contents of Bin(x) is then incremented by one, i.e., New Bin(x)=Old Bin(x)+1. This is done for all pixels in segmented object image 130, or for selected subsets (e.g., every other one) of these pixels.

The Hue histogram 650 is a representation of how color (Hue) is distributed in the image of segmented object(s) 130. In other words, the content of each bin describes how may pixels in 130 have color represented by that bin. If F1 is some other feature, it is a representation of how that feature is distributed in image of object 130. The content of each bin describes how many pixels in 130 have feature value represented by that bin.

Figure 7:
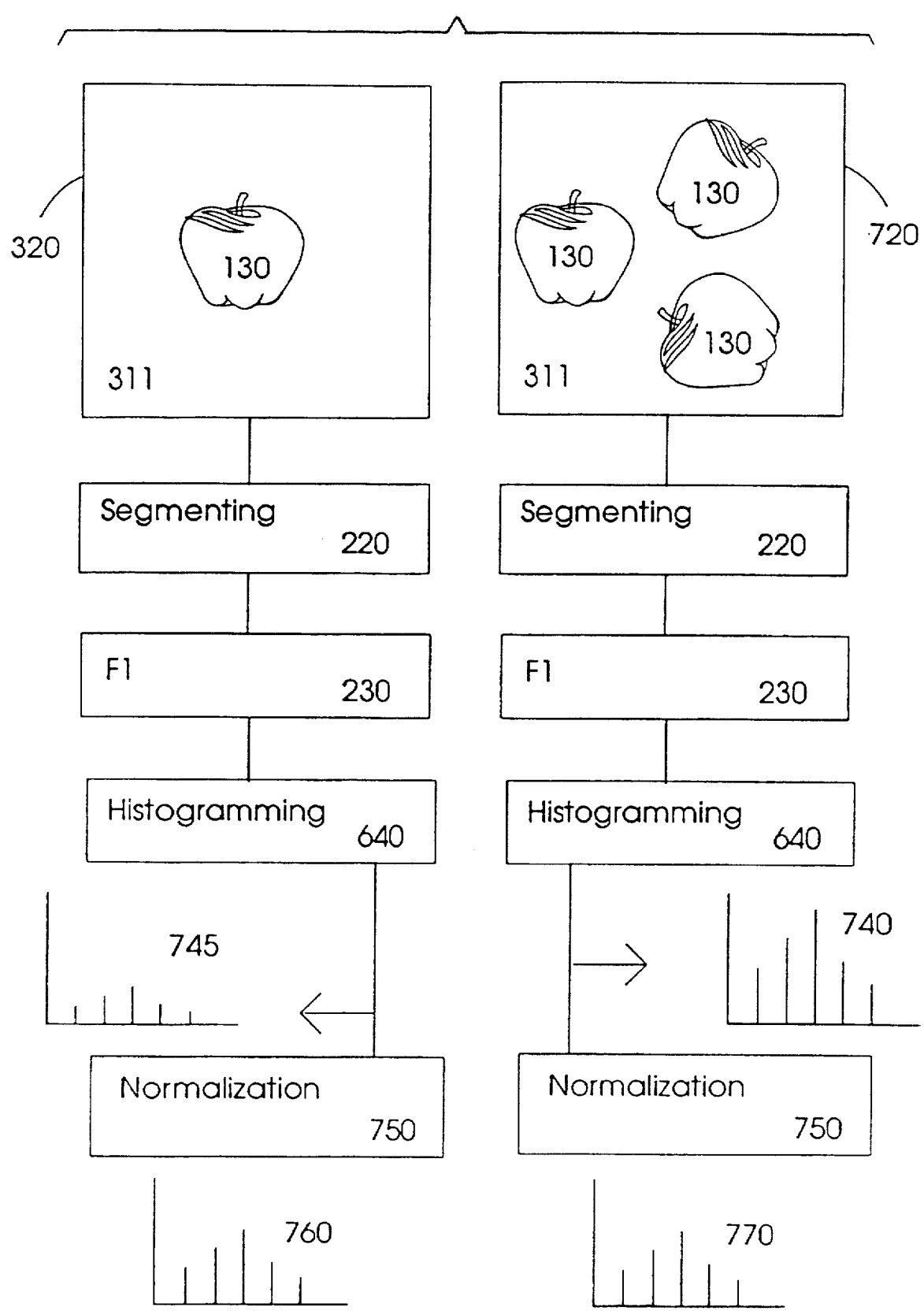
FIG. 7 is a flow chart showing a preferred method for (area/length) normalization of object feature(s) characterization.

FIG. 7 is a flow chart showing the steps of normalizing a histogram feature and how these normalized feature histograms are unaffected by the size or number of the object(s) 131 imaged.

Image 320 is a segmented color image exhibiting one segmented object 131 image 130. Image 720 is a segmented color image of three instances of object 131, exhibiting three segmented object images 130. One or more feature(s) F1 are computed as described in FIG. 6, and two histograms are developed, histogram 745 and histogram 740, respectively. In step 750, each histogram (745,740) is normalized using the same method of normalization 750. Since the present invention novelly normalizes 750 only the segmented images of the objects (130) in each image (320, 720), the resulting normalized histogram (770 and 760 respectively) are identical. This result occurs even though the image 720 with a larger number of objects 131 will contribute a higher pixel count to each bin of the histogram 740 than the image 320 with a fewer number of objects 131 will contribute to its respective histogram 745. (Note that the same effect occurs if the size of the object 131 is greater 720 in one image than in the other 320.) For example, area normalizing creates approximately equal normalized histograms (760, 770) because the contribution of the segmented image to its histogram is divided by its respective image area.

Area1, that is the segmented object image area 130 in color image 320 is computed by adding the content of all the bins of histogram 745. Area2, that is the segmented area for all the objects 130 (or the larger sized object) for image 720 is computed in same fashion. To obtain area normalized histogram 760, histogram 745 is divided, bin by bin, by the value Area1. The area normalized histogram 770 is computed by dividing bin by bin histogram 740 by Area2. After this operation, area normalized histogram 760 is approximately equal to area normalized histogram 770 and readily compared 260 as in the description of FIG. 8.

Normalization can be done with respect to any property that can be extracted from segmented object image 130. Area, length, and size are examples. Other measures that describe the shape can be used, such measures include but are not limited to, second and higher-order (shape) moments, the size of bounding rectangle, area of the convex hull of object image 130.

Figure 8:
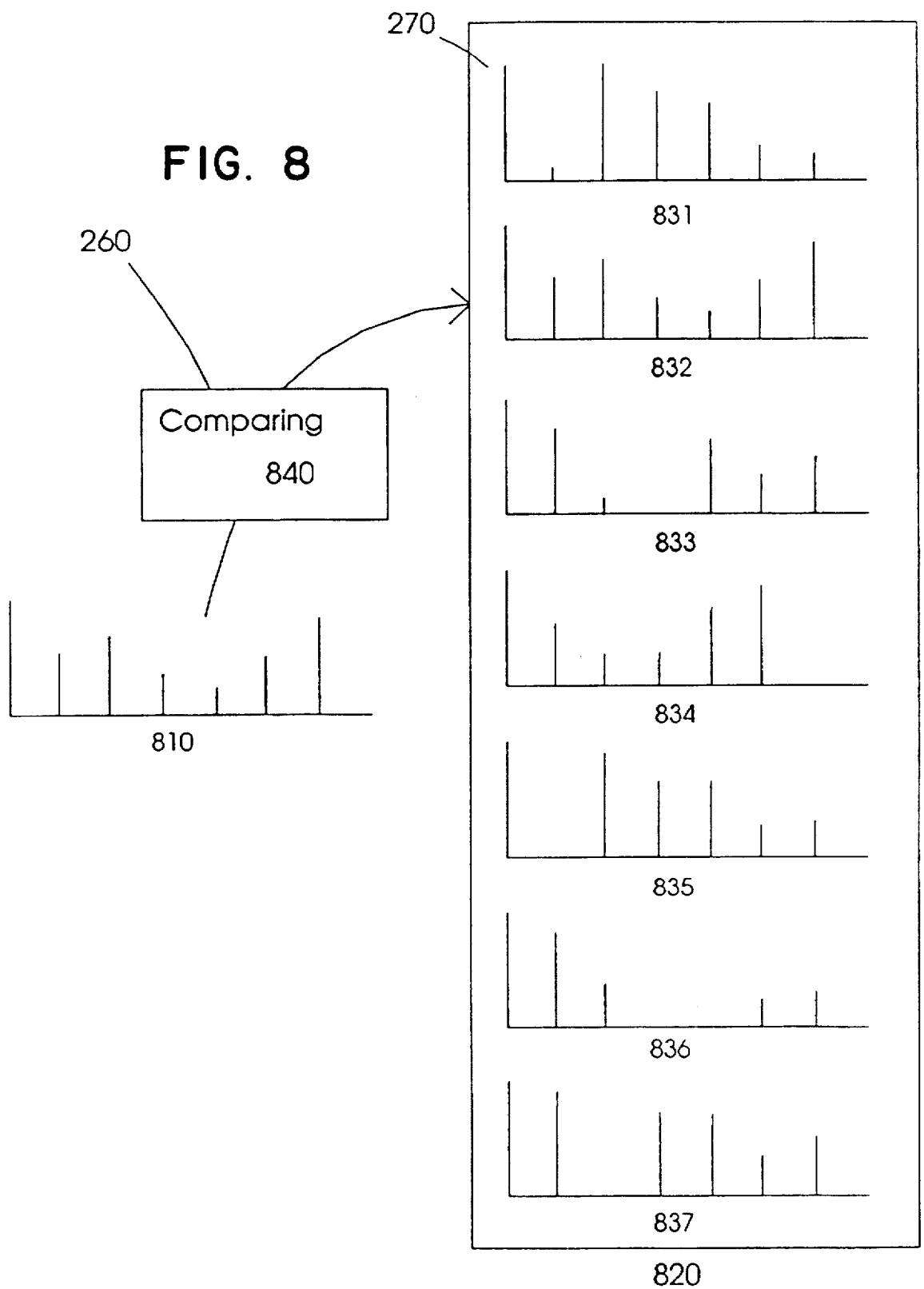
FIG. 8 illustrates the comparison of an area/length normalized target object characterization to one or more area normalized reference object characterizations.

FIG. 8 illustrates the step 260 of algorithm 200 that compares 840 the normalized characterizations (760, 770) of the segmented target image 130 to one or more stored normalized reference characterizations 270. Characterizations 810 represents normalized characterization of some segmented image containing a target object. This characterization is obtained as described in FIG. 7. Block 820 is a list (database) of area normalized reference characterizations obtained as described, e.g., in FIG. 9. These are representations of the objects that the system is to be able to recognize. Each of the plurality of normalized characterization representations are labeled typically as 831, . . . , 837. Only six are shown, but the number of area normalized histogram representations can be very large, e.g.,in the 100s or even 1000s. Each object to be recognized should be represented by at least one normalized characterization but can be represented by more than one normalized characterization. Each area normalized characterization in 820 has associated with it a descriptive identifier of the object that the normalized characterization is developed from. Characterization 810 and reference characterizations 820 are not limited to one characterization, representation can be multiple characterizations. In that case, multiple characterizations are developed from the image of the target object while multiple characterizations represent each reference object. Again, each such collection of characterizations is associated with a unique object identifier. See the description of FIG. 10.

Block 840 shows the comparison/matching of the target characterization to the reference characterizations. A preferred means of matching/comparing characterizations is to determine a distance measure, L1, between target histogram and reference histograms. For example, let target histogram 810 be represented as a vector T of numbers and reference histograms 820 as vectors R1 through some RN. For this disclosure, the best match of the target histogram T is defined as that reference histogram RI for which the L1 distance (sometimes called Manhattan distance) between T and R1 . . . RI . . . RN is smallest. That is, RI would give the smallest L1 distance of distances $$\text{Dist}(T-RJ), \ldots, J=1, 2, \ldots, N$$

Matching algorithms like this are well known as nearest neighbor classification. Any measure of distance that exhibits the usual properties of a distance measure (prior art) can be used here. Further, other measures that do not exhibit properties of distance, e.g., Histogram Intersection, could be used. Weights can be associated with the components of target histogram T and reference histograms R1 . . . RN, resulting in a component-wise weighted distance measure.

If target object and reference objects are represented by multiple histograms, preferred representations can be viewed as higher dimensional vectors containing multiple concatenated histograms, T' and R1' . . . RN'. One preferred way to define the best match of such a concatenated target histogram to T' is defined as that concatenated reference histogram RI' for which the L1 distance between T' and R1' . . . RN' is smallest. Here, different weights may be assigned to different subvectors, representing different feature histograms, in the L1 distance. Again, any distance measure can be used, and also measures that do not exhibit properties of distance, e.g., Histogram Intersection, can be applied. Weights can be associated with every with the components of target histogram T' and reference histograms R1' . . . RN', resulting in a component-wise weighted distance measure.

It is intended in this invention that object(s) 131 shown is of one type. Presenting multiple objects, Object A and Object B, can result in unpredictable results. The most likely result is that objects are flagged as unrecognizable. It could happen however, due to the distance measure used, that recognition result is: (1) object is Object A; (2) object is Object B; (3) object is Object A or Object B—presented as choices in user interface of FIG. 5. The latter happens when mixed objects are of similar appearance, like, Granny Smith apples and Golden Delicious apples. It is unlikely that objects are recognized as some other Object C stored in 820.

Figure 9:
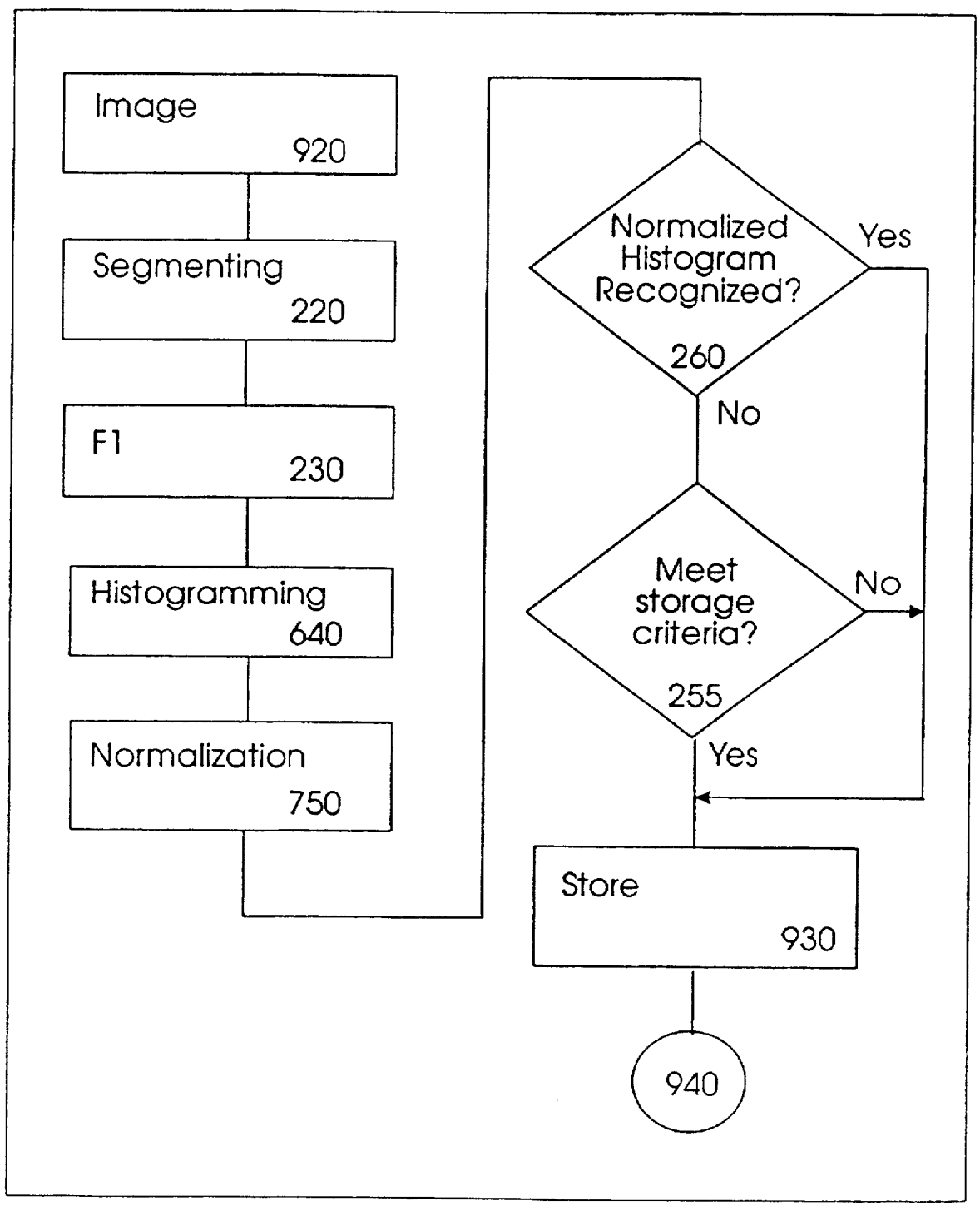
FIG. 9 is a flow chart showing a preferred (algorithmic) method of training the present apparatus to recognize new images.

FIG. 9 is a flow chart showing the method 910 steps for training the system by adding to storage 270 (concatenated) reference histograms that meet certain storage criteria 255. The training method 910 enables the apparatus 100 to recognize new objects/items, i.e., those not originally stored in the system storage 270. The training 910 begins by presenting the apparatus with an image 920 of the object/ item. The image is segmented 220 and then features are determined 230 for histogramming 640 as described above. The normalized (concatenated) histogram 750 is compared 260 as before. If the target normalized histogram is matched with a reference normalized histogram in storage, the target image is recognized. If not, the method 910 continues to check the target normalized image against certain storage criteria 255. If the storage criteria are not met, the method ends 940. If the target normalized image meets the storage criteria 255, the target normalized image is stored in the storage device 270 where it can be used later to match other target images.

It is important that image 920 is obtained with device operating in same fashion as will be used later on recognize different instances of said object(s) 13. The preferred embodiment of such a device is described in FIG. 4 with and polarized light through filter 410 and polarizing filter 420 on camera. Polarizations is of particular importance because during training and recognition, object(s) 131 can have very unpredictable specular reflection (glare) effects.

Training also can be achieved through interactive input/ output device 160; it can be achieved through human intervention, either by cashier in front end or by produce manager in back room. This is further described in FIG. 15.

Figure 10:
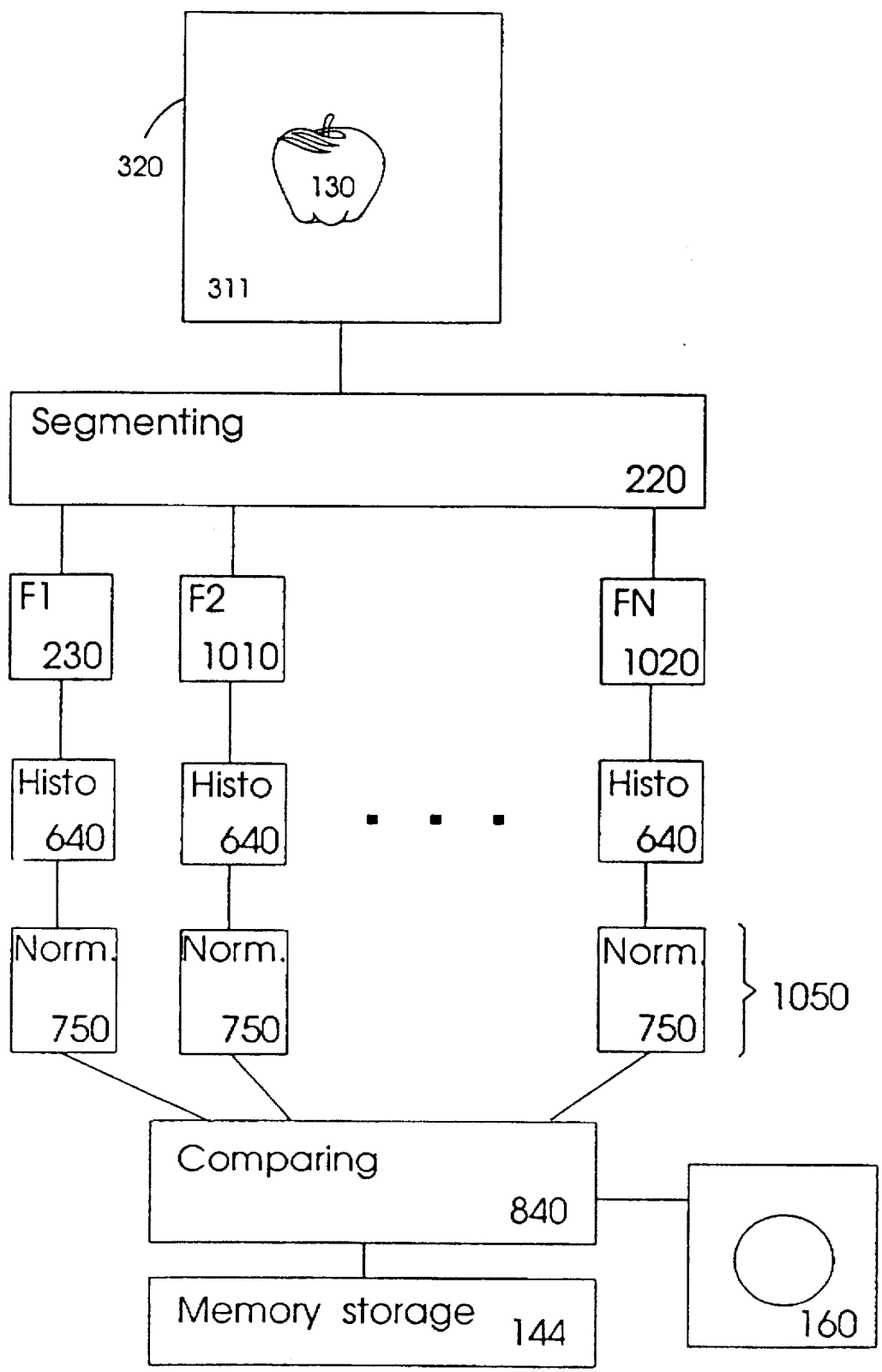
FIG. 10 is a block diagram showing multiple features of an object being extracted.

FIG. 10 is a flow chart showing the steps of extracting more than one feature from an image and using more than one feature to identify an object. The method begins with an image 320 of an object 130 and background 311. As before, the object image 130 is segmented 220 from the background 311. Multiple features are then extracted from segmented image 320 in the same manner as Hue F1 (230) is extracted as described above. Blocks 1010 . . . 1020 typically refer to other plurality of features extracted. These include, but are not limited to, Saturation, Intensity, Texture (described in FIG. 11), Boundary Shape (described in FIG. 12) and Density (described in FIG. 13). As for color, the HSI representation is the preferred means of representing color for this invention. Other color representations may be used, including, but not limited to RGB, Munsell, opponent colors.

Once the features F1–FN are extracted, they are histogrammed and normalized as described above. Although many features, like color can be area normalized, other normalizations (e.g., length, boundaries) are possible that might be particularly suited to a feature. For example, see below in FIG. 12 for shape histograms.

In step 840, each of the extracted features, F1–FN, are compared. This comparison is already described in FIG. 8. Essentially the extracted N histograms (of features F1–FN) are concatenated in a long histogram and comparison is based on some distance measure between target concatenated histogram and reference concatenated histograms. In this distance measure, histograms of individual features F1–FN could be weighted with different weights w1–wN. Alternatively, in distance measure, each individual component of concatenated histogram can have a individual weight. As mentioned above, features F1–FN include, but are not limited, Hue, Saturation, Intensity, Texture, Shape. Not all of these features have equal discriminative power, and therefore, weights w1–wN may be used. Moreover, not every component of an individual feature, say FI, may have equal discriminative power. So, individual feature histograms can be weighted differently component-wise.

Figure 11:
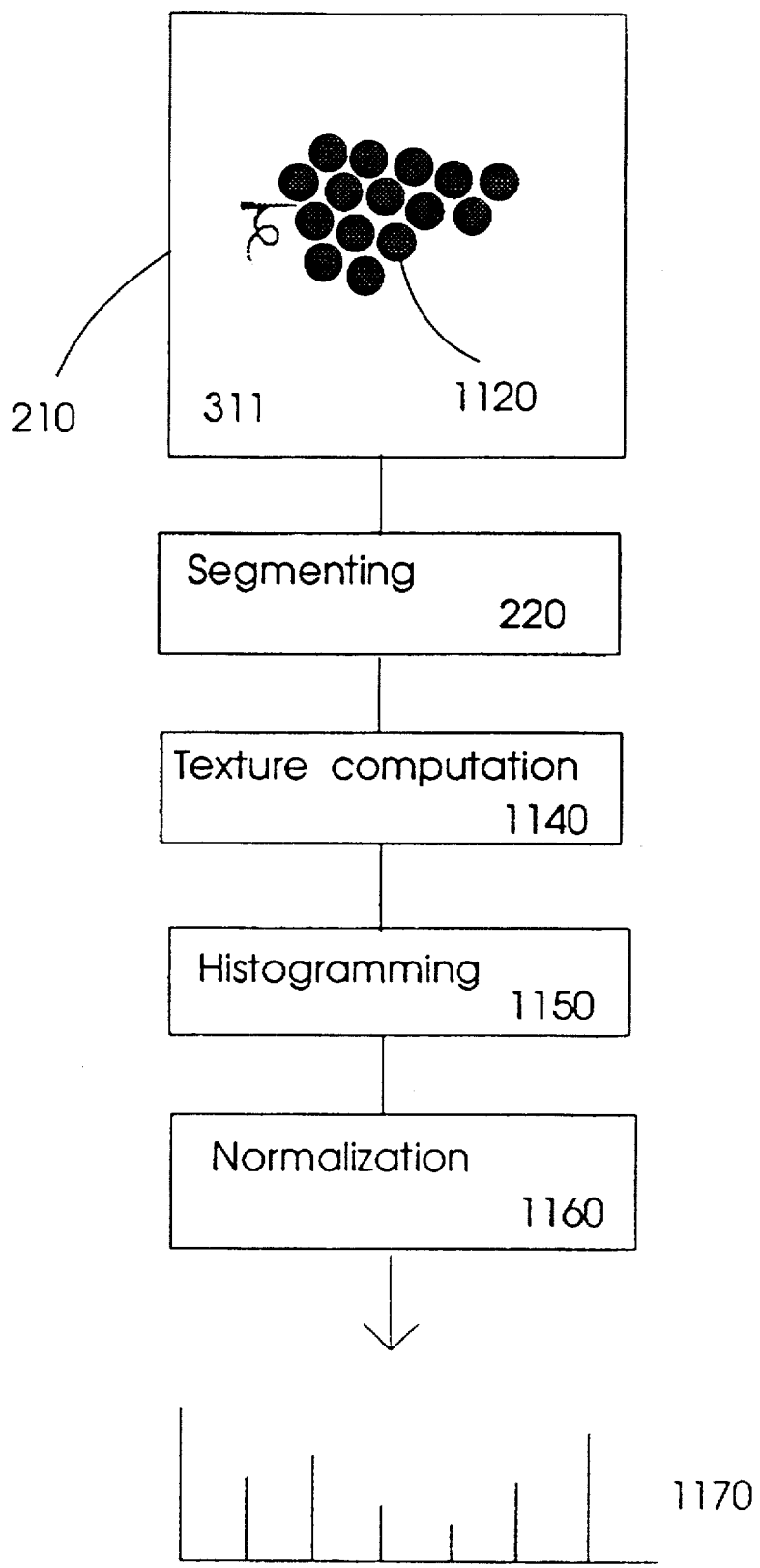
FIG. 11 is a flow chart showing the histogramming and normalizing of the feature of texture.

FIG. 11 illustrates how texture is used as a normalized recognition feature. Block 210 is an image of an object/item that exhibits the feature of texture 1120. As before, the object image is segmented 220 from its background. In step 1140 the texture feature is computed from the segmented image. Any texture measure known in the prior art could be used in this 1140 computation. However, two novel computation are preferred.

The first preferred means of texture computation is a novel texture measure A:

Segmented image is transferred into a binary image by selecting a threshold Tb using methods in the prior art. If image brightness is larger than Tb, binary image is set to 1; if image brightness is smaller than Tb, binary image is set to 0. Other means, known to a person skilled in the art, for binarizing images also can be used. The result is a blob-like black and white image. Each blob can be characterized by a Width and a Length; the texture measure (WE) associated with a blob is given by Width Eccentricity=Width/Length This is a texture measure which is determined using region calculations.

A second preferred novel texture measure B is the following.

The image is convolved using prior art methods with [−1 2 −1] mask, this convolution is performed both vertically and horizontally, denoted by Vconv and Hconv, respectively. At each pixel x where the convolution result is over some threshold T2, the vector consisting of Magnitude and Direction Magnitude=sqrt (Vconv(x)**2* Hconv(x)**2)

Direction=arctan (Vconv(x)/Hconv(x))

are defined as the texture measure. This is a texture measure which is determined using edge calculations.

The texture feature can also be histogrammed in a novel way 1150, that is, only over segmented object image 1120. The texture measures are histogrammed over the segmented image as described above. For texture measure A, this results in (Width-Eccentricity) histogram, where Width and Eccentricity are defined above. Texture measure B, gives a (Magnitude-Direction) histogram, where Magnitude and Direction are defined above. For the Direction histogram, the maximum direction in the Direction histogram is computed and the histogram cyclically shifted to bring this peak to the center. This will make the Direction histogram independent of the rotation under which texture is imaged.

Texture histograms are normalized by count. Here count can be each pixel in segmented object image 1120, or count could be those pixels in segmented object image 1120 that actually exhibits texture. Other shape measures extracted from the textured region can be envisioned by a person skilled in the art. A resulting normalized texture histogram is shown as 1170. Use of texture histograms for recognizing objects is believed novel.

Figure 12:
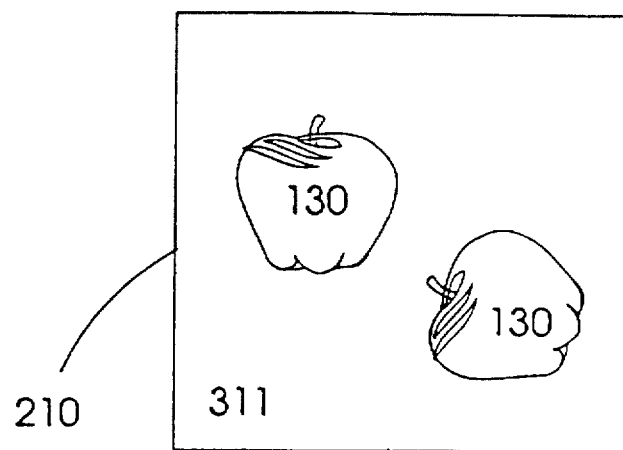
FIG. 12 is a flow chart showing the histogramming and normalizing of the feature of boundary shape.
Figure 12:
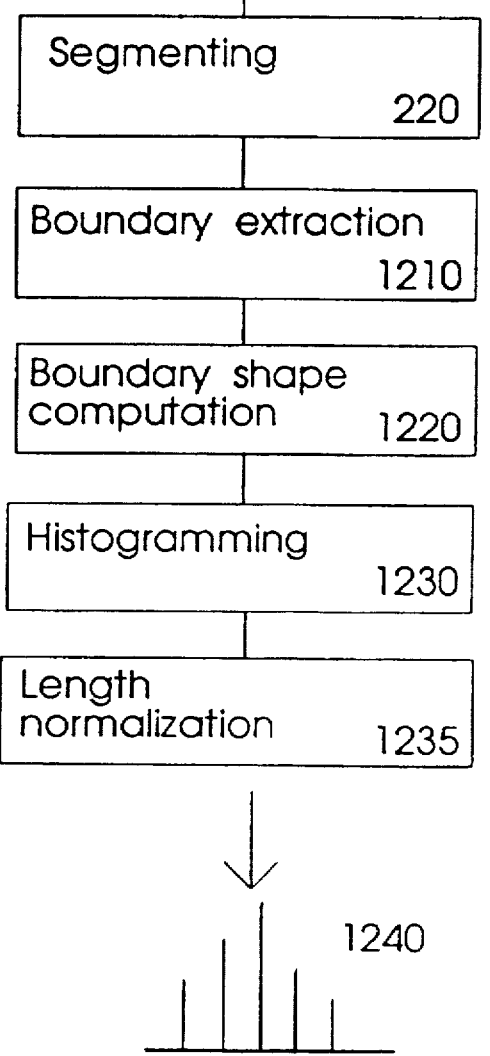

FIG. 12 is a flow chart showing the steps of using shape as a recognition feature. The image 210 is segmented 220 as above. Next a determination of which pixels in object image 130 are boundary pixels is made 1210. A pixel P is a boundary pixel if one or more neighboring pixels of P belong to background image 311. Next a determination is made of a boundary shape property 1220 for each boundary pixel P. A preferred shape measure used by this invention is local boundary curvature at pixel P. The radius R of a circle that fits the center pixel P and number of the surrounding boundary pixels is first computed by computer 140. The curvature 1/R describes the local degree of variation for pixel P—zero curvature for a straight line boundary, high curvature for a locally "wiggly" boundary. An apple will have a roughly constant curvature boundary, while a cucumber has a piece of low curvature, a piece of low negative curvature, and two pieces of high curvature (the end points). Other shape measures are possible.

The boundary shape feature(s) are then histogrammed 1230 The histogramming is developed by the computed shape properties of boundary pixels P. Instead of over an area, histograms here are developed from a collection of image pixels P that comprise the boundary of object image 130.

The normalization done 1235 is a lengthy normalization of the shape histogram. Bin by bin, the histogram of 1230 is divided by the total number of boundary pixels P. The result is that the length normalized shape histogram of one object image 130 is equal to the length normalized shape histogram of multiple object images 130. Length normalized object image boundary shape histograms are a novel feature of this invention. Other normalizations related to length of the object image boundary are possible.

Density can be an important recognition feature. A pound of white onions weighs as much as a pound of mushrooms, but the volume of the mushrooms is much larger than that of the white onions. Therefore, the relation between weight and volume is important. This relation is object density determined by Density=Weight (Object 131)/Volume (Object 131)

FIG. 13 is a block diagram showing the computer 140 connected to a weighing device 170 that determines the weight of the object(s) 131. To use weight as recognition feature, device 170 reports the weight of object(s) 131 to computing device 140. In a preferred embodiment, the system 100 uses a weight a "Density" feature defined as "Density"=Weight (Object 130)/Area (Segmented object 131)

This measure does not embody the conventional means of referring to density, rather it is a measure of pressure. It is called the average projected density.

True density of object(s) 131 can only be computed very roughly. To get an idea of the volume of object(s) 131, the boundary contour(s) of 130 can be approximated with an ellipse and the volume(s) of 131 can be approximated by the volume of an ellipsoid of revolution developed from the approximated ellipse. Density, then, is given by Weight/Volume.

Other means for estimating volume from a projected segmented object image 130 are within the scope of this invention.

Figure 14:
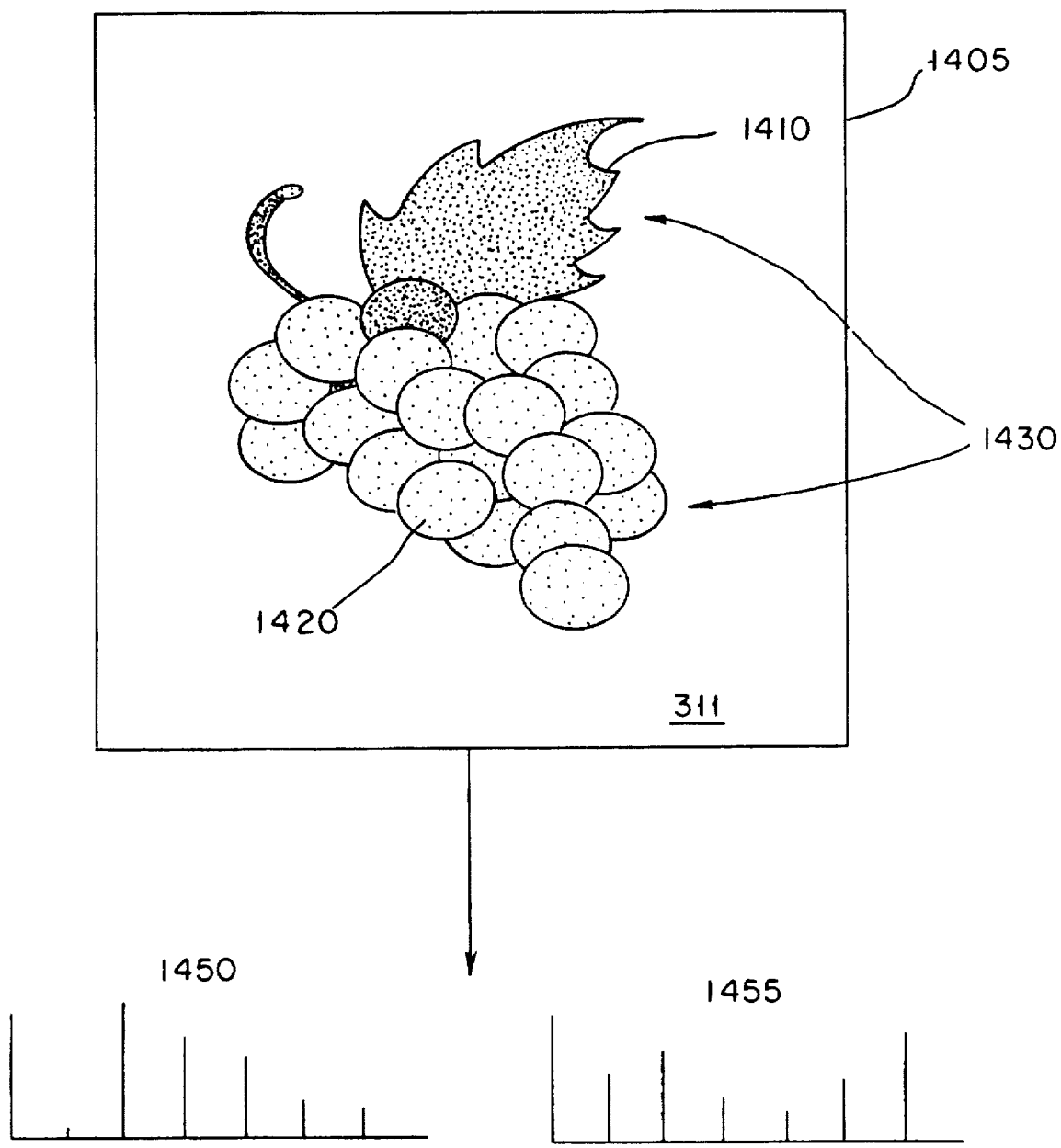
FIG. 14 shows an image where the segmented object has two distinct regions determined by segmenting the object image and where these regions are incorporated in recognition algorithms.

Multiple reference histograms representing the same feature F1 (e.g., Hue) can be used to recognize a given object. FIG. 14 shows an image 1405 where segmented object image 130 has two distinct regions, i.e., the leaves 1410 and the grapes 1420. The image 1405 comprises the object 130 and background 311. The object image 130 is segmented along its first object region 1410 and its second 1420 object region. These object regions are recognized and defined by using a segmentation algorithm. A preferred algorithm is the use of an area normalized Hue histogram for detecting if there are two or more distinct peaks.

These regions are histogrammed and area normalized separately. Area normalized histograms 1450 and 1455 correspond to the first 1410 and second 1420 region, respectively, and are compared to reference histograms as described above. Additionally, relative location 1430 of regions 1410 and 1420 can be taken into account during matching (FIG. 8). This part of the invention accounts for items where a feature, e.g., color, but not limited to color, is not uniform over the surface of the object 131 and hence not uniform over the segmented object image 130. A typical example are carrots with the leafy part left on.

Figure 15:
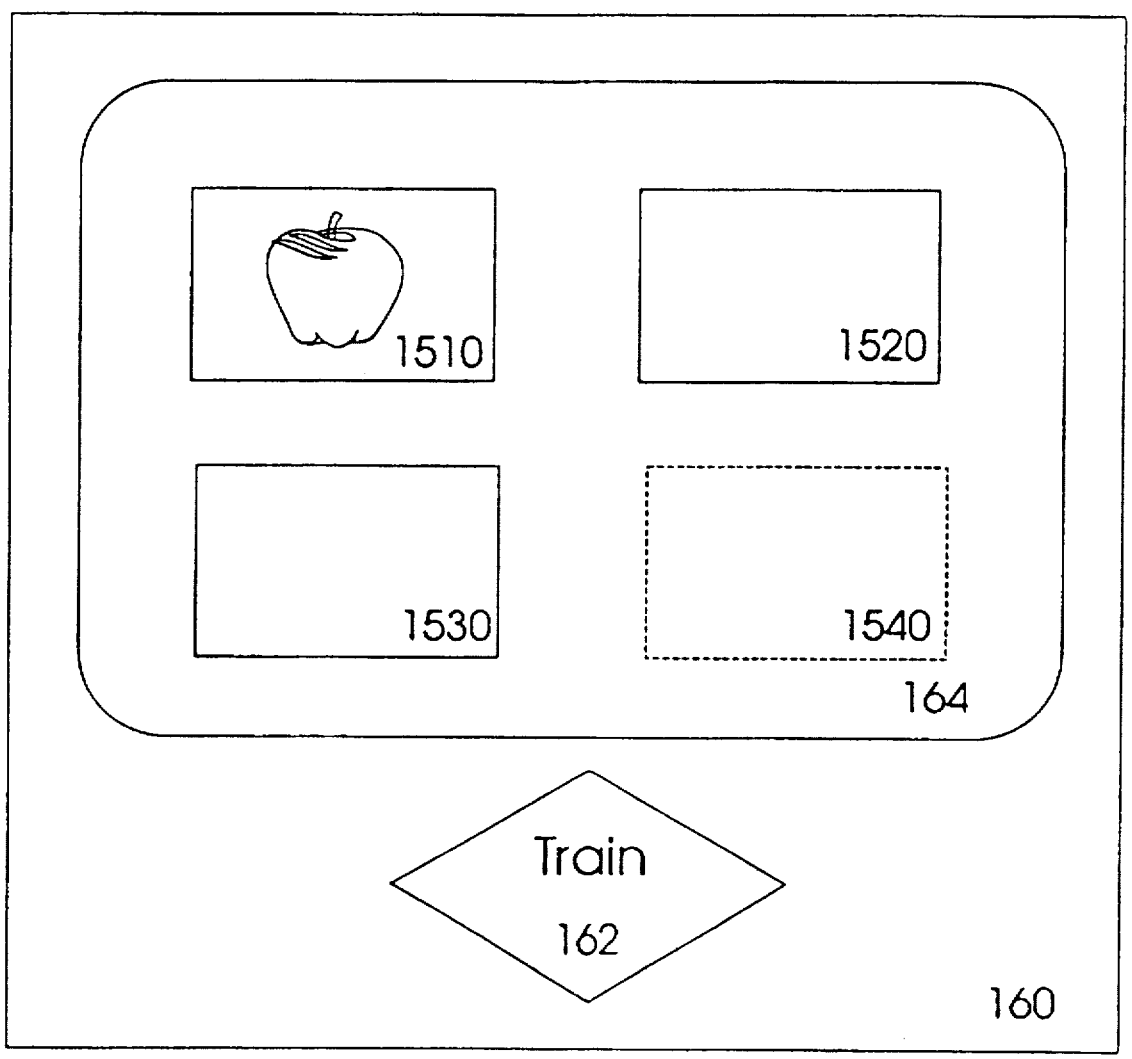
FIG. 15 shows a human interface to the present apparatus which presents an ordered ranking of the most likely identities of the produce being imaged.

FIG. 15 shows an optional human interface 160. It comprises a preferred means of displaying 164 of pictorial (or otherwise explained) description(s) 1510, 1520, 1530 and 1540 of various possible identities of object(s) 131 that are determined by apparatus 100. In most cases, object(s) 131 can be uniquely identified by comparison 260 to the reference database 270. However, in some cases, there may be a match to more than one reference histogram, i.e., the target object normalized histogram may be approximately the same as more than one reference histogram. In these cases a human can be novelly asked through the interface 160 to make the final recognition decision. A preferred embodiment of the interface 160 offers four or fewer choices—1510, 1520, 1530, 1540. More choices can be optionally requested as explained later. The human can communicate the decision to computer 140 through any means, touch, voice, mouse, keyboard. In addition, a means (button) 162 can be provided on the interface to enable the user to determine when and if a histogram should be added to the reference object database 820 in storage 270, i.e., if the system is to be trained with that data to recognize (or better recognize) instance of object 131 when presented to system 100 at some future point.

Figure 16:
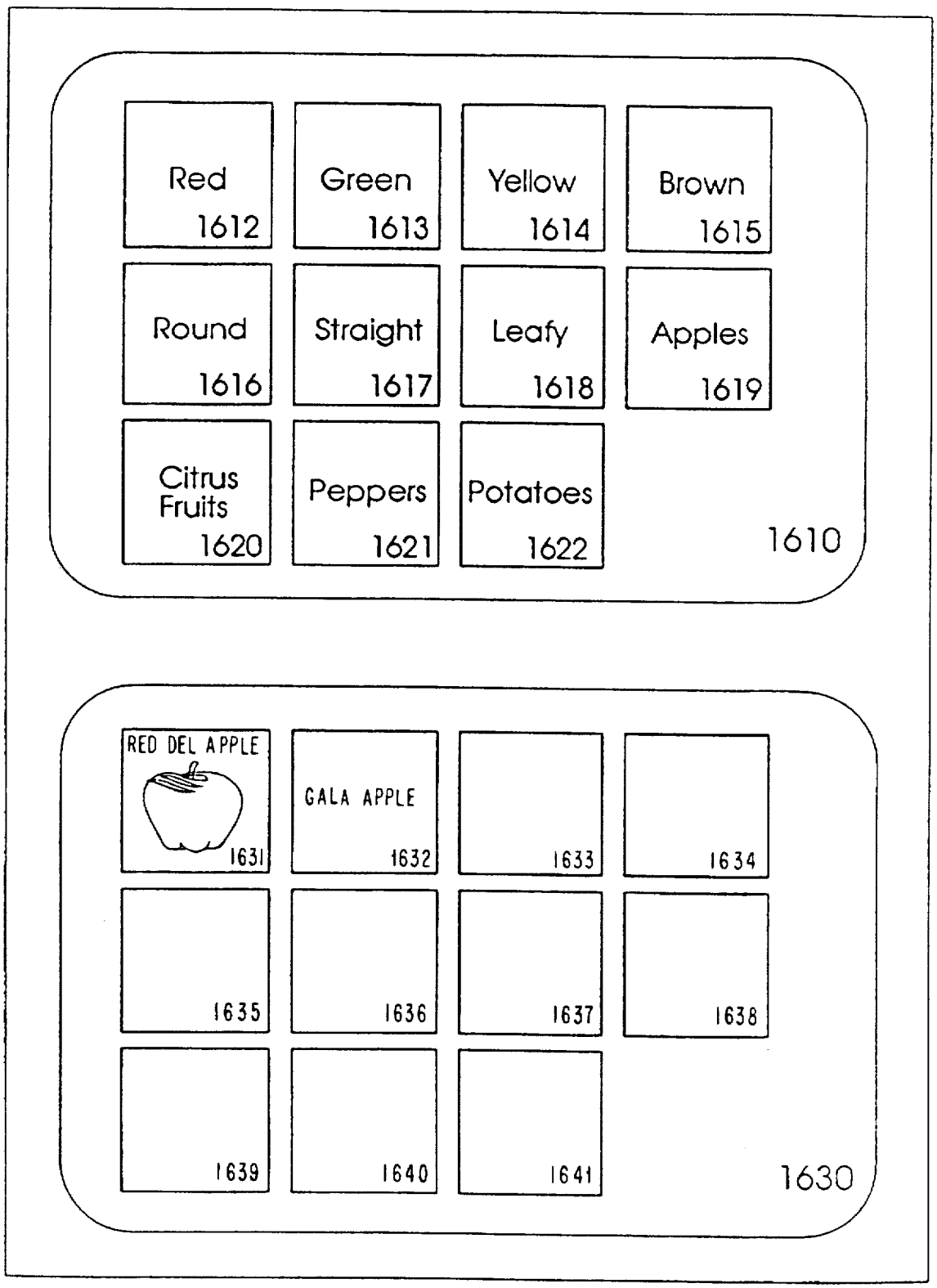
FIG. 16 shows a means for human determination of the identity of object(s) by browsing through subset(s) of all the previously installed stored icon images, and the means by which the subsets are selected.

FIG. 16 shows an interface 160 with a function, like a browsing key, that allows the user to browse for an object identity. A browsing key refers to a key word or key feature by which to narrow down the human guided search for object identity in the database 820. Examples of such keys are, but are not limited to: Red 1612, Green 1613, Yellow 1614, Brown 1615, Round 1616, Straight 1617, Leafy 1618, Apples 1619, Citrus Fruits 1620, Peppers 1621, and Potatoes 1622, as displayed in 1610. The user can communicate through touch, voice, mouse, keyboard, etc. The key 1600 will respond with either another instance of 1610, in which the choices presented 1612–1622 are more specific, or with screen 1630 where a final decision can be made. If 1619, e.g. apples, is selected, 1600 will present human with screen 1630, offering descriptions (sketches, photographs, words) 1631–1641 of identity of the object(s) 131. The user can select choices on the screens using various known input devices. Any other human-friendly method or means can be used.

Figure 17:
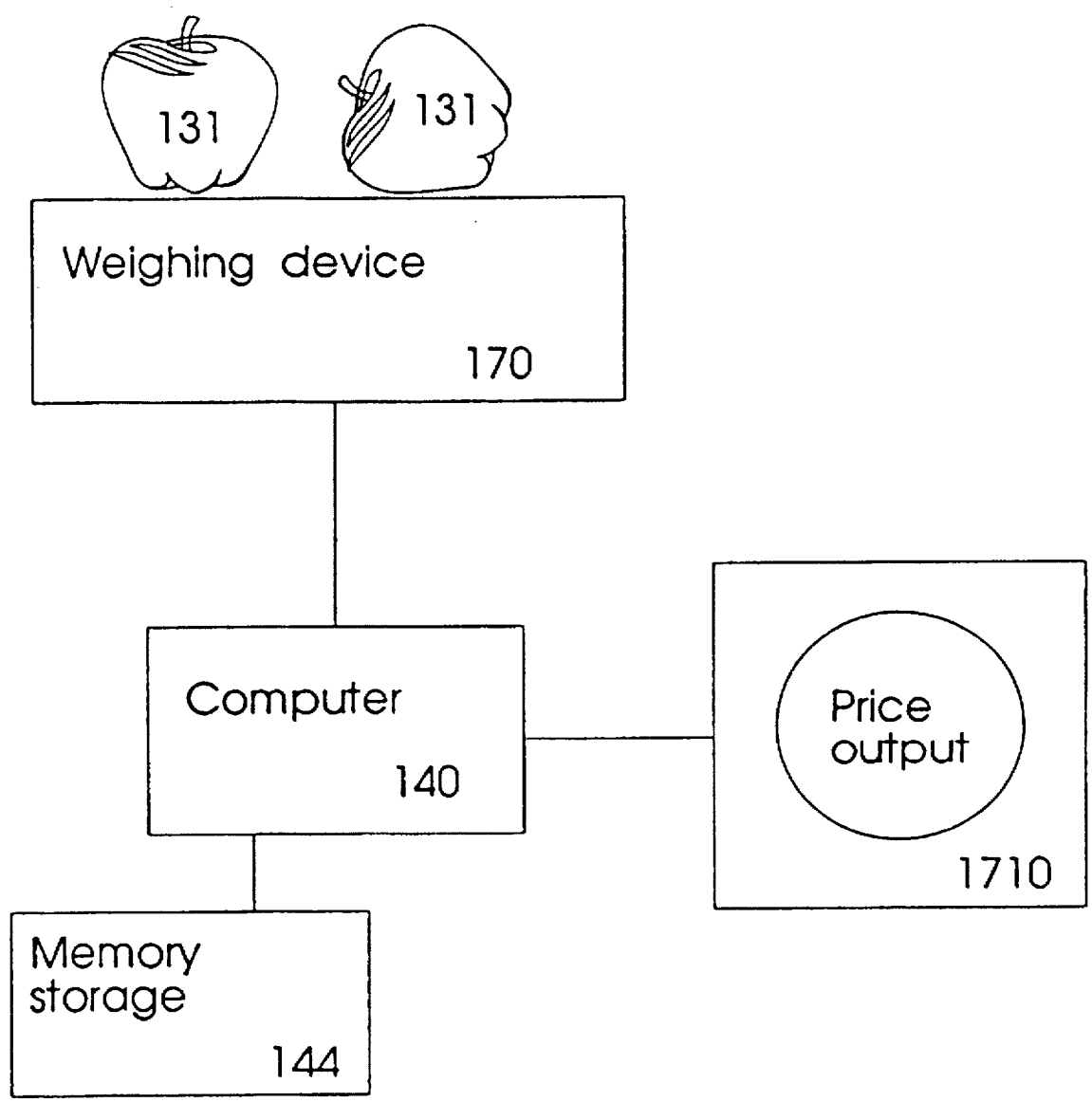
FIG. 17 is a preferred embodiment of the present invention using object weight to price object(s).

FIG. 17 is a block diagram showing optional apparatus used with system 100 to price objects. A weighing device 170 is used to determine the weight of object(s) 131. The apparatus 100 recognizes the object as described above. Once the object is recognized, a price of the object is determined. The weight 170 and or the count (number of items present) of the object is used if required in the pricing. The prices of the objects are stored in memory 144.

Price device 1710 is attached to apparatus 100 to communicate the price to the user. Price device 1710 can be a printing device, display device, or any other means of communicating the price of the object. The price can also be displayed on the interactive output device 160.

If price is specified by pound, the computer 140 calculates prices as

Price=Weight*(Price of object 131 per pound)

If price is specified by count, computer 140 calculates price as

Price=Count*(Unit price of object 131)

Item count can either be obtained through human intervention or can be estimated.

For entering count through human intervention, system 100 will simply prompt human to enter count if item 131 is indicated in computer memory 140 as being sold by count (e.g., lemons, limes). There are two ways automatically estimating Count:

a) Apparatus 100 has average weight of object 131 in memory 144 and Count is computed as Count=Weight/Average weight (object 131)

after identity of object 131 is established from segmented object image 13.

b) Apparatus 100 makes an estimate of number of segmented object images 130 are present, and Count=Number of segmented object images 130.

We claim:

1. A system for recognizing objects comprising:

a. a light source for illuminating one or more of the objects, the illuminated objects being a target object, the light source having a non-monochromatic light frequency distribution that is constant over a period of time;

b. a computer system having a visual input device for creating one or more scene images, the scene images capable of including a target object image of the target object and a background image, and the computer system further having a memory storage;

c. a segmenter executing on the computer system that produces a segmented target object image by segmenting the target object image from background image by comparing a first scene image with a second scene image, the first and second scene images being in spatial registration and one or more respective positions in the first and second scene images having a difference being identified as the target object image;

d. a plurality of reference normalized characterizations, each reference normalized characterization being of a feature associated with a segmented reference object, the reference normalized characterizations being stored in the computer memory storage; and e. a normalizer executing on the computer system that produces one or more target normalized characterizations, each target normalized characterization being of a feature of the segmented target object image, whereby one or more of the target normalized characterizations, is compared with one or more reference normalized characterizations and the target object is recognized as the associated reference object if the compared target normalized characterizations and reference normalized characterizations match.

2. A system as in claim 1, where the feature is hue.

3. A system as in claim 1, where one or more of the reference characterizations are histograms.

4. A system, as in claim 1, where one or more of the reference characterizations is a hue histogram.

5. A system for recognizing objects comprising:

a. a light source for illuminating a scene, the light source having a non-monochromatic light frequency distribution that is constant over a period of time, the light source controlled to illuminate the scene at a first illumination level and at a second illumination level lower than the first illumination level, the scene comprising one or more of the objects, being a target object, and a background;

b. a computer system having a memory storage, a visual input device for creating a scene image including a target object image of the target object and a background image, and an algorithm that produces a segmented target object image by segmenting the target object image from the background image in the scene image, the algorithm segmenting the target object image by comparing a first scene image taken at the first illumination level with a second scene image taken at a second illumination level;

c. a plurality of reference normalized histograms, each of the reference normalized histograms being a histogram of a feature associated with an associated segmented reference object, the reference normalized histograms being stored in the computer memory storage; and d. a normalizer that produces one or more target normalized histograms, each of the target normalized histograms being a histogram of a feature of the segmented target object image, the normalizer normalizing each of the target normalized histograms the same way as the reference normalized histograms are normalized, whereby one or more of the target normalized histograms, is compared with one or more of the reference normalized histograms and the target object is recognized as the associated segmented reference object if the target and reference normalized histograms of a feature match.

6. A system, as in claim 5, where one or more of the reference normalized histograms is a normalization of an area feature.

7. A system, as in claim 5, where one or more of the reference normalized histogram is a normalization of a length feature.

8. A system, as in claim 7, where the feature is shape and whereby a target shape histogram must match a reference histogram in order for the target object to be recognized.

9. A system, as in claim 5, where one or more of the reference normalized histograms is a normalization with respect to the feature that is a measure extracted from the segmented object image.

10. A system, as in claim 5, where the feature is hue and the hue feature is area normalized.

11. A system, as in claim 10, where a second feature is saturation and a target normalized saturation histogram of the segmented image also has to match a reference normalized saturation histogram before the target object is recognized.

12. A system, as in claim 5, where the feature is saturation and the saturation histogram is area normalized.

13. A system, as in claim 5, where the feature is texture and a target texture histogram must match a reference texture histogram in order for the target object to be recognized.

14. A system, as in claim 13, where texture is determined using region calculations.

15. A system, as in claim 13, where texture is determined using edge calculations.

16. A system, as in claim 5, further comprising:

a. a scale that weighs the target object;

b. a reference segmented object average projected density of the object, a representation of the reference projected density being stored in computer memory storage; and c. a target segmented object projected density;

whereby the target object projected density must match the reference projected density in order to identify the target object.

17. A system, as in claim 16, where the average projected density is determined by dividing the object weight by the object area.

18. A system, as in claim 5, where both the target and reference object images are obtained through a polarizing filter.

19. A system, as in claim 5, where the target object has two or more target region features each representing a distinct region on the target object, where each target region feature histogram and the relative positions of the region feature match a respective reference region feature histogram stored in computer memory storage in order for the target object to be recognized.

20. A system, as in claim 19, where the target object region features are in a relative position and the relative position has to match a stored relative position in order for the target object to be recognized.

21. A system, as in claim 5, where the area of the target object is determined by removing the background from the object image by taking the first scene image without the object and the second scene image with the object and subtracting the first scene image from the second scene image at pixel locations where the first scene image is equal to the second scene image.

22. A system, as in claim 5, where the first scene image is taken when the light source is off and the second scene image is taken when the light source is on and the target object image is segmented by selecting the pixels that are darker in the first scene image and brighter in the second scene image.

23. A system, as in claim 5, where the objects are bulk items and the video input device is a color video camera.

24. A system, as in claim 5, where the objects are produce and the video input device is a color video camera.

25. A system for recognizing objects comprising:
   a. a light source for illuminating a scene, the light source having a non-monochromatic light frequency distribution that is constant over a period of time, the light source controlled to illuminate the scene at a first illumination level and at a second illumination level lower than the first illumination level, the scene comprising one or more of the objects, being a target object, and a background;
   b. a computer system having a memory storage, a visual input device for creating a scene image including a target object image and a background image, and an algorithm that produces a segmented target object image by segmenting the target object image from the background image in the scene image, the algorithm segmenting the target object image by comparing a first scene image taken at the first illumination level with a second scene image taken at the second illumination level;
   c. a plurality of reference normalized histograms, each reference normalized histogram being a histogram of a feature associated with a segmented reference object, the reference normalized histograms being stored in the computer memory storage; and
   d. a normalizer that produces one or more target normalized histograms, each of the target normalized histograms being a histogram of a feature of the segmented target object image, the the normalizer normalizing the target normalized histograms the same way as the reference normalized histograms are normalized; and
   e. a means for determining if an unrecognized target object image meets a set of storage criteria,
whereby one or more of the target normalized histograms is compared with one or more of the reference normalized histograms and the target object is not recognized as the associated segmented reference object because the target and reference histograms of a feature do not match and the target normalized histogram is stored in memory storage if it meets the set of storage criteria.

26. A system, as in claim 25, that identifies the object to a user through a user interface.

27. A system, as in claim 26, where the user interface gives the user a selection of two or more possible identities of the object.

28. A system, as in claim 26, where the user interface is a touch screen.

29. A system, as in claim 26, where the interface is a voice recognition system.

30. A system, as in claim 26, where the interface enables the user to browse through object selections.

31. A system, as in claim 25, further comprising:
   a scale that weighs the object,
   whereby the price of the bulk item is determined based on the weight and recognition of the object.

32. A method for recognizing objects comprising the steps of:
   a. illuminating the one or more of the objects, the illuminated objects being a target object, with a light source, the light source having a non-monochromatic light frequency distribution that is constant over a period of time;
   b. creating a scene image with a computer system having a visual input device, the scene image comprising a target object image and a background image, the computer system having a memory storage an algorithm for producing a segmented target object image by segmenting the target object image from the background image of the scene;
   c. producing one or more target normalized characterizations, each target normalized characterization being a characterization of a feature of the segmented target object image
   d. comparing one or more of the target normalized characterizations to one or more reference normalized characterization in memory storage, each reference characterization of a feature associated with a segmented reference object; and
   e. recognizing the target object as a reference object when one or more or the target normalized characterizations matches one or more of the reference normalized characterizations.

* * * * *